US010311455B2

(12) United States Patent
Notani et al.

(10) Patent No.: US 10,311,455 B2
(45) Date of Patent: *Jun. 4, 2019

(54) COMPUTER PROGRAM PRODUCT AND METHOD FOR SALES FORECASTING AND ADJUSTING A SALES FORECAST

(71) Applicant: One Network Enterprises, Inc., Dallas, TX (US)

(72) Inventors: Ranjit Notani, Plano, TX (US); Greg Brady, Dallas, TX (US); Sivakoumar Arumugam, Flower Mound, TX (US)

(73) Assignee: One Network Enterprises, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,752

(22) Filed: Mar. 4, 2013

(65) Prior Publication Data
US 2013/0179220 A1 Jul. 11, 2013

Related U.S. Application Data

(63) Continuation-in-part of application No. 10/887,468, filed on Jul. 8, 2004, now abandoned, and a
(Continued)

(51) Int. Cl.
G06Q 10/00 (2012.01)
G06Q 30/02 (2012.01)

(52) U.S. Cl.
CPC ................ G06Q 30/0202 (2013.01)

(58) Field of Classification Search
USPC .............................. 705/7.11–7.42
See application file for complete search history.

(56) References Cited

U.S. PATENT DOCUMENTS 5,615,109 A 3/1997 Eder
5,953,707 A 9/1999 Huang et al.
(Continued)

FOREIGN PATENT DOCUMENTS

WO WO 200227614 4/2002
WO WO 200235393 5/2002
(Continued)

OTHER PUBLICATIONS

The Influence of Master Data Management on the Enterprise Data Model T Haughey, LLC InfoModel—pdfs.sennanticscholar.org, Feb. 19, 2009 (Year: 2009).*
(Continued)

Primary Examiner — Jonathan G Sterrett
(74) Attorney, Agent, or Firm — Karl L. Larson

(57) ABSTRACT

A computer program product and method for sales forecasting and adjusting a sales forecast for an enterprise in a configurable region having one or more clusters of stores. The method includes periodically receiving a sales forecast for an enterprise over a configurable period of time, periodically receiving actual sales information, sales anomalies and anticipated events within the at least one of the clusters of stores over a computer network, determining positive and negative deviations from the anticipated sales of the sales forecast based on the sales information, determining whether one or more trends are occurring or have occurred using a pre-defined mathematical expression based on the sales information, the positive and negative deviations, and the sales anomalies, adjusting the anticipated sales of the sales forecast based on the sales anomalies, the trends and the anticipated events, and outputting the adjusted sales forecast to a user. The sales forecast includes anticipated sales for a plurality of items within at least one of the clusters of stores.

12 Claims, 19 Drawing Sheets

Related U.S. Application Data continuation-in-part of application No. 12/511,313, filed on Jul. 29, 2009, now Pat. No. 8,086,588, and a continuation of application No. 12/730,805, filed on Mar. 24, 2010, now Pat. No. 8,392,228, and a continuation-in-part of application No. 13/165,789, filed on Jun. 22, 2011, now Pat. No. 8,352,300.

(56) References Cited

U.S. PATENT DOCUMENTS

| | | | |
|---|---|---|---|
| 6,157,915 A | 12/2000 | Bhaskaran et al. | |
| 6,304,867 B1 | 10/2001 | Schmidt | |
| 6,574,631 B1 | 6/2003 | Subrramanian | |
| 6,578,005 B1 | 6/2003 | Lesaint et al. | |
| 6,609,101 B1* | 8/2003 | Landvater | G06Q 10/06 705/7.25 |
| 6,801,229 B1 | 10/2004 | Tinkler | |
| 6,804,657 B1* | 10/2004 | Sultan | G06Q 10/06 705/1.1 |
| 6,910,017 B1* | 6/2005 | Woo | G06Q 10/06 705/29 |
| 7,050,813 B1* | 5/2006 | Paiz | H04M 15/00 379/114.01 |
| 7,103,565 B1 | 9/2006 | Vaid | |
| 7,130,807 B1 | 10/2006 | Mikurak | |
| 7,130,885 B2 | 10/2006 | Chandra | |
| 7,212,976 B2 | 5/2007 | Scheer | |
| 7,523,142 B2 | 4/2009 | Driesen | |
| 7,716,189 B1 | 5/2010 | Panchbudhe | |
| 7,797,182 B2* | 9/2010 | Lindquist | G06Q 10/06375 705/7.31 |
| 7,809,659 B1 | 10/2010 | Paiz | |
| 8,103,538 B2 | 1/2012 | Bamberg et al. | |
| 2002/0072958 A1* | 6/2002 | Yuyama | G06Q 30/0202 705/7.31 |
| 2002/0087438 A1 | 7/2002 | Kunieda et al. | |
| 2002/0091593 A1* | 7/2002 | Fowler | G06Q 10/087 705/28 |
| 2002/0095457 A1 | 7/2002 | Sharma et al. | |
| 2002/0138316 A1 | 9/2002 | Katz et al. | |
| 2002/0161664 A1 | 10/2002 | Shaya et al. | |
| 2002/0169657 A1* | 11/2002 | Singh | G06Q 10/06 705/7.31 |
| 2003/0018546 A1 | 1/2003 | Ayala et al. | |
| 2003/0050819 A1 | 3/2003 | Koenigbauer et al. | |
| 2003/0078846 A1 | 4/2003 | Burk | |
| 2003/0233264 A1 | 12/2003 | Jones et al. | |
| 2004/0030428 A1 | 2/2004 | Crampton et al. | |
| 2004/0088239 A1 | 5/2004 | Eder | |
| 2004/0098296 A1* | 5/2004 | Bamberg | G06Q 10/087 705/7.31 |
| 2004/0117048 A1 | 6/2004 | Wei | |
| 2004/0128214 A1* | 7/2004 | Ishida | G06Q 10/087 705/28 |
| 2004/0128261 A1* | 7/2004 | Olavson | G06Q 30/0283 705/400 |
| 2004/0172319 A1 | 9/2004 | Eder | |
| 2004/0181378 A1* | 9/2004 | Gilmore | G06Q 10/06 703/6 |
| 2004/0249698 A1* | 12/2004 | Kouno | G06Q 10/06 705/7.31 |
| 2005/0091226 A1* | 4/2005 | Lin | G06F 17/30902 |
| 2005/0131755 A1* | 6/2005 | Chen | G06Q 30/0202 705/7.31 |
| 2005/0209732 A1 | 9/2005 | Audimoolan et al. | |
| 2006/0095309 A1* | 5/2006 | Mangan | G06Q 10/00 717/123 |
| 2006/0271390 A1 | 11/2006 | Rich | |
| 2006/0294151 A1* | 12/2006 | Wong | G06F 17/30557 |
| 2007/0225949 A1 | 9/2007 | Sundararajan et al. | |
| 2008/0027830 A1 | 1/2008 | Johnson et al. | |
| 2008/0052149 A1 | 2/2008 | Fischer et al. | |
| 2009/0006149 A1* | 1/2009 | Yarter | G06Q 10/00 705/7.36 |
| 2009/0012983 A1* | 1/2009 | Senneville | G06F 17/30566 |
| 2009/0106178 A1* | 4/2009 | Chu | G06N 20/00 706/14 |
| 2009/0125796 A1* | 5/2009 | Day | G06F 9/451 715/219 |
| 2009/0299783 A1* | 12/2009 | Barton | G06Q 10/06 705/7.23 |
| 2010/0217712 A1 | 8/2010 | Fillmore | |
| 2010/0223284 A1 | 9/2010 | Brooks | |
| 2010/0325173 A1 | 12/2010 | Haley | |
| 2011/0060621 A1 | 3/2011 | Weller et al. | |

FOREIGN PATENT DOCUMENTS

| | | |
|---|---|---|
| WO | WO 200235438 | 5/2002 |
| WO | WO 200250633 | 6/2002 |

OTHER PUBLICATIONS

"Current practices in active data warehousing" R Hackathorn—Bolder Technology, 2002—Citeseer (Year: 2002).*

A service-oriented architecture for business intelligence L Wu, G Barash, C Bartolini—Service-Oriented Computing and . . . , 2007—ieeexplore.ieee.org (Year: 2007).*

Federated data warehouse architecture R Jindal, A Acharya—Wipro Technologies white paper, 2004—hosteddocs.ittoolbox.com (Year: 2004).*

Freeman, Eva, "Supply chain: modeling makes the difference," Datamation, v43, n10 p. 64 (5), Oct. 1997.

Mason-Jones, R., Towill, D.R., "Information enrichments: designing the supply chain for competitive advantage," Supply Chain Management, v2n4, pp. 137, 1997.

Chandrashekar, Ashok, Schary, Philip, B, "Toward the virtual supply chain: The convergence of IT and organization," International Journal of Logistics Management, v10n2, pp. 2.

Desmond, John P., "Chain Reaction," Software Magazine, Sep. 1999.

Neofora.com, Inc. to Acquire U.S. Lifeline, Inc., Leader in Supply Chain Content to Extend Neoforma.com's Service Offering, Business Wire, Mar. 9, 2000.

Motwani, Jaideep, Madan, Manu, Gunasekaran, A., "Information technology in managing global supply chains," Logistics Information Management, v.13n5, pp. 320-327, 2000.

Prasad, Sameer, Tata, Jasmine, "Information Investment in supply chain management," Logistics Information Management, v.13n1. pp. 33-38, 2000.

Smith, Mark, "Business-Critical Prism: A Strategic Assessment Guide for BI Products," Intelligent Enterprise, 4, 15, 29, Oct. 4, 2001.

Yan, Shangyao, Tu, Yu-Ping, "Multifleet routing and multistop flight scheduling for schedule perturbation," European Journal of Operational Research, 1997, vol. 103 pp. 155-169.

Notani et al., U.S. Appl. No. 12/511,313, Publ. No. 2011-0029577, entitled "Computer Program Product and Method for Sharing Information . . . ," dated Jul. 29, 2009 (Now U.S. Pat. No. 8,086,588).

Notani et al., U.S. Appl. No. 10/887,468, Publ. No. 2006-0010020, entitled "Non-Stale Incremental Planning," dated Dec. 26, 2008 (Pending).

Notani et al., U.S. Appl. No. 10/887,218, entitled "Real-Time Planning and Execution With Minimum Perturbation," dated Jul. 8, 2004 (Abandoned).

Jain et al., U.S. Appl. No. 10/060,572, Publ. No. 2003-0144858, entitled "Method and Apparatus for Providing Intelligent and Controlled . . . ," dated Jan. 29, 2002 (Now U.S. Pat. No. 7,739,121).

Mulukutla et al., U.S. Appl. No. 12/730,805, Publ. No. 2011-0238461, entitled "Computer Program Product and Method for Sales Forecasting . . . ," dated Mar. 24, 2010 (Now U.S. Pat. No. 8,392,228).

Notani et al., U.S. Appl. No. 13/165,789, Publ. No. 2011-0264485, entitled "System, Computer Program and Method for Implementing and . . . ," dated Jun. 21, 2011 (Now U.S. Pat. No. 8,352,300).

(56) References Cited

OTHER PUBLICATIONS

Greg Brady, U.S. Appl. No. 14/020,249, entitled "System and Computer Program Product for Providing Targeted Marketing . . . ," dated Sep. 6, 2013 (Pending).

* cited by examiner

| ITEM | |
|---|---|
| ✓ SYS_ITEM_ID | NUMBER(19) NOT NULL |
| ⊙ ITEM_NAME | VARCHAR2(64) NOT NULL |
| DISPLAY_NAME | VARCHAR2(255) |
| DESCRIPTION | VARCHAR2(1024) |
| TYPE_NAME | VARCHAR2(64) NOT NULL |
| ⊙ ENT_NAME | VARCHAR2(64) NOT NULL |
| ✓ SYS_ENT_ID | NUMBER(19) NOT NULL |
| ⊙ VC_ID | NUMBER(19) NOT NULL |
| STR_UDF1 | VARCHAR2(512) |
| STR_UDF2 | VARCHAR2(512) |
| STR_UDF3 | VARCHAR2(512) |
| STR_UDF4 | VARCHAR2(512) |
| STR_UDF5 | VARCHAR2(512) |
| STR_UDF6 | VARCHAR2(512) |
| STR_UDF7 | VARCHAR2(512) |
| STR_UDF8 | VARCHAR2(512) |
| STR_UDF9 | VARCHAR2(512) |
| STR_UDF10 | VARCHAR2(512) |
| STR_UDF11 | VARCHAR2(512) |
| STR_UDF12 | VARCHAR2(512) |
| STR_UDF13 | VARCHAR2(512) |
| STR_UDF14 | VARCHAR2(512) |
| STR_UDF15 | VARCHAR2(512) |
| NUM_UDF1 | FLOAT |
| NUM_UDF2 | FLOAT |
| NUM_UDF3 | FLOAT |
| NUM_UDF4 | FLOAT |
| NUM_UDF5 | FLOAT |
| NUM_UDF6 | FLOAT |
| NUM_UDF7 | FLOAT |
| NUM_UDF8 | FLOAT |
| NUM_UDF9 | FLOAT |
| NUM_UDF10 | FLOAT |
| NUM_UDF11 | FLOAT |
| NUM_UDF12 | FLOAT |
| NUM_UDF13 | FLOAT |
| NUM_UDF14 | FLOAT |
| NUM_UDF15 | FLOAT |
| MFG_ENT_NAME | VARCHAR2(64) |
| MFG_ITEM_NAME | VARCHAR2(64) |
| ✓ MFG_ITEM_ID | NUMBER(19) |
| UNIVERSAL_ITEM_NAME | VARCHAR2(64) |
| GTIN | VARCHAR2(64) |
| PRICE | FLOAT |
| MSRP | FLOAT |
| PURCHASE_COST | FLOAT |
| TOTAL_LANDED_COST | FLOAT |
| LINEAR_UOM | NUMBER(4) |
| WEIGHT_UOM | NUMBER(4) |
| WIDTH | FLOAT |
| HEIGHT | FLOAT |
| LENGTH | FLOAT |
| WEIGHT | FLOAT |
| STYLE | VARCHAR2(64) |
| SIZE_CODE | VARCHAR2(64) |
| COLOR | VARCHAR2(64) |
| CASE_WEIGHT_UOM | NUMBER(4) |
| CASE_LINEAR_UOM | NUMBER(4) |
| CASE_WIDTH | FLOAT |
| CASE_HEIGHT | FLOAT |
| CASE_LENGTH | FLOAT |

\* \* \*

— 602

\* \* \*

| | |
|---|---|
| CASE_WEIGHT | FLOAT |
| PALLET_WEIGHT_UOM | NUMBER(4) |
| PALLET_LINEAR_UOM | NUMBER(4) |
| PALLET_WIDTH | FLOAT |
| PALLET_HEIGHT | FLOAT |
| PALLET_LENGTH | FLOAT |
| PALLET_WEIGHT | FLOAT |
| STD_CASE_ITEM_CNT | NUMBER(9) |
| STD_PALLET_ITEM_CNT | NUMBER(9) |
| STD_PALLET_CASE_CNT | NUMBER(9) |
| REPLENISHMENT_TYPE | NUMBER(4) |
| RLT | NUMBER(19) |
| IS_ACTIVE | NUMBER(1) |
| CURRENCY | NUMBER(9) |
| STR_UDF16 | VARCHAR2(512) |
| STR_UDF17 | VARCHAR2(512) |
| STR_UDF18 | VARCHAR2(512) |
| STR_UDF19 | VARCHAR2(512) |
| STR_UDF20 | VARCHAR2(512) |
| STR_UDF21 | VARCHAR2(512) |
| STR_UDF22 | VARCHAR2(512) |
| STR_UDF23 | VARCHAR2(512) |
| STR_UDF24 | VARCHAR2(512) |
| STR_UDF25 | VARCHAR2(512) |
| LAST_MODIFIED_DATE | TIMESTAMP(6) |
| LAST_MODIFIED_USER | VARCHAR2(64) |
| PRIMARY | NUMBER(1) |
| LAST_COMPUTED_DATE | TIMESTAMP(6) |
| RUN_REPLENISHMENT | NUMBER(1) |
| ORDERING_UOM | NUMBER(4) |
| STOCKING_UOM | NUMBER(4) |
| ORD_TO_STOCK_CONV_FACTOR | FLOAT |
| ✓ RTL_SYS_VENDOR_ENT_ID | NUMBER(19) |
| DFX_DEACTIVATION_DATE | TIMESTAMP(6) |
| ACTIVATION_DATE | TIMESTAMP(6) |
| DEACTIVATION_DATE | TIMESTAMP(6) |
| RTL_ALT_UPC | VARCHAR2(64) |

COMPUTER PROGRAM PRODUCT AND METHOD FOR SALES FORECASTING AND ADJUSTING A SALES FORECAST

CROSS REFERENCE TO RELATED APPLICATIONS

The present application is a continuation of and claims priority to U.S. patent application Ser. No. 12/730,805, entitled "Computer Program Product and Method for Sales Forecasting and Adjusting a Sales Forecast," filed in the U.S. Patent and Trademark Office on Mar. 24, 2010, having at least one common inventor as the present document and hereby incorporated by reference. The present application is also a continuation-in-part of and claims priority to U.S. patent application Ser. No. 10/887,468, entitled "Non-stale Incremental Planning," filed in the U.S. Patent and Trademark Office on Jul. 8, 2004, having at least one common inventor as the present document and hereby incorporated by reference. The present application is also a continuation-in-part of and claims priority to U.S. patent application Ser. No. 12/511,313, entitled "Computer Program Product and Method for Sharing Information Between Multiple Computer Applications Using a Grafted Model Network," filed in the U.S. Patent and Trademark Office on Jul. 29, 2009, having at least one common inventor as the present document and hereby incorporated by reference. The present application is also a continuation-in-part of and claims priority to U.S. patent application Ser. No. 13/165,789, now U.S. Pat. No. 8,352,300, entitled "System, Computer Program and Method for Implementing and managing a Value Chain Network," filed in the U.S. Patent and Trademark Office on Jun. 22, 2011, having at least one common inventor as the present document and hereby incorporated by reference.

BACKGROUND OF THE INVENTION

Field of the Invention

The present invention is generally related to forecasting, and more particularly to a computer program product and method for sales forecasting and adjusting a sales forecast.

Discussion of the Background

To meet customer demand, enterprises, such as, without limitation, stores and other retail entities, forecast the future demand of their customers, including, without limitation, other enterprises, the general public and other entities or persons to which the enterprise serves or has a relationship. A sales forecast is utilized to, amongst other things, manage resources, including, without limitation, ensuring that the appropriate amount of inventory and resources are available when and where they are needed. A plan is often generated based on the sales forecast. A plan typically specifies the movement and placement of inventory and resources, and includes a plurality of actions that need to be taken to maintain inventory at a certain level.

In an increasingly global economy, there is a need for enterprises to receive sales and other related information from stores and other retail entities and to update their sales forecasts and plans to better adapt to changes and/or trends in local and regional sales. Timely updates to sales forecasts based on actual sales and/or events relating to such are also often important to accurate enterprise resource planning ("ERP").

Arrangements that are known in the prior art for updating sales forecasts do not adequately provide for forecasting as described in the present invention and, as such, inventory and resources may be misapplied or not optimally used by the enterprise.

Thus, there currently exist deficiencies in sales forecasting and adjusting a sales forecast.

SUMMARY OF THE INVENTION

Accordingly, one aspect of the present invention is to provide a computer program product for sales forecasting and adjusting a sales forecast for an enterprise in a configurable region having one or more clusters of stores. The computer program product includes a first computer code for periodically receiving a sales forecast for an enterprise over a configurable period of time, a second computer code for periodically receiving actual sales information, sales anomalies and anticipated events within the at least one of the clusters of stores over a computer network, a third computer code for determining positive and negative deviations from the anticipated sales of the sales forecast based on the sales information, a fourth computer code for determining whether one or more trends are occurring or have occurred using a pre-defined mathematical expression based on the sales information, the positive and negative deviations, and the sales anomalies, a fifth computer code for adjusting the anticipated sales of the sales forecast based on the sales anomalies, the trends and the anticipated events, and a sixth computer code for outputting the adjusted sales forecast to a user. The sales forecast includes anticipated sales for a plurality of items within at least one of the clusters of stores.

Another aspect of the present invention is to provide a method for a computer program product and method for sales forecasting and adjusting a sales forecast for an enterprise in a configurable region having one or more clusters of stores. The method includes periodically receiving a sales forecast for an enterprise over a configurable period of time, periodically receiving actual sales information, sales anomalies and anticipated events within the at least one of the clusters of stores over a computer network, determining positive and negative deviations from the anticipated sales of the sales forecast based on the sales information, determining whether one or more trends are occurring or have occurred using a pre-defined mathematical expression based on the sales information, the positive and negative deviations, and the sales anomalies, adjusting the anticipated sales of the sales forecast based on the sales anomalies, the trends and the anticipated events, and outputting the adjusted sales forecast to a user. The sales forecast includes anticipated sales for a plurality of items within at least one of the clusters of stores.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

Figure 2D:
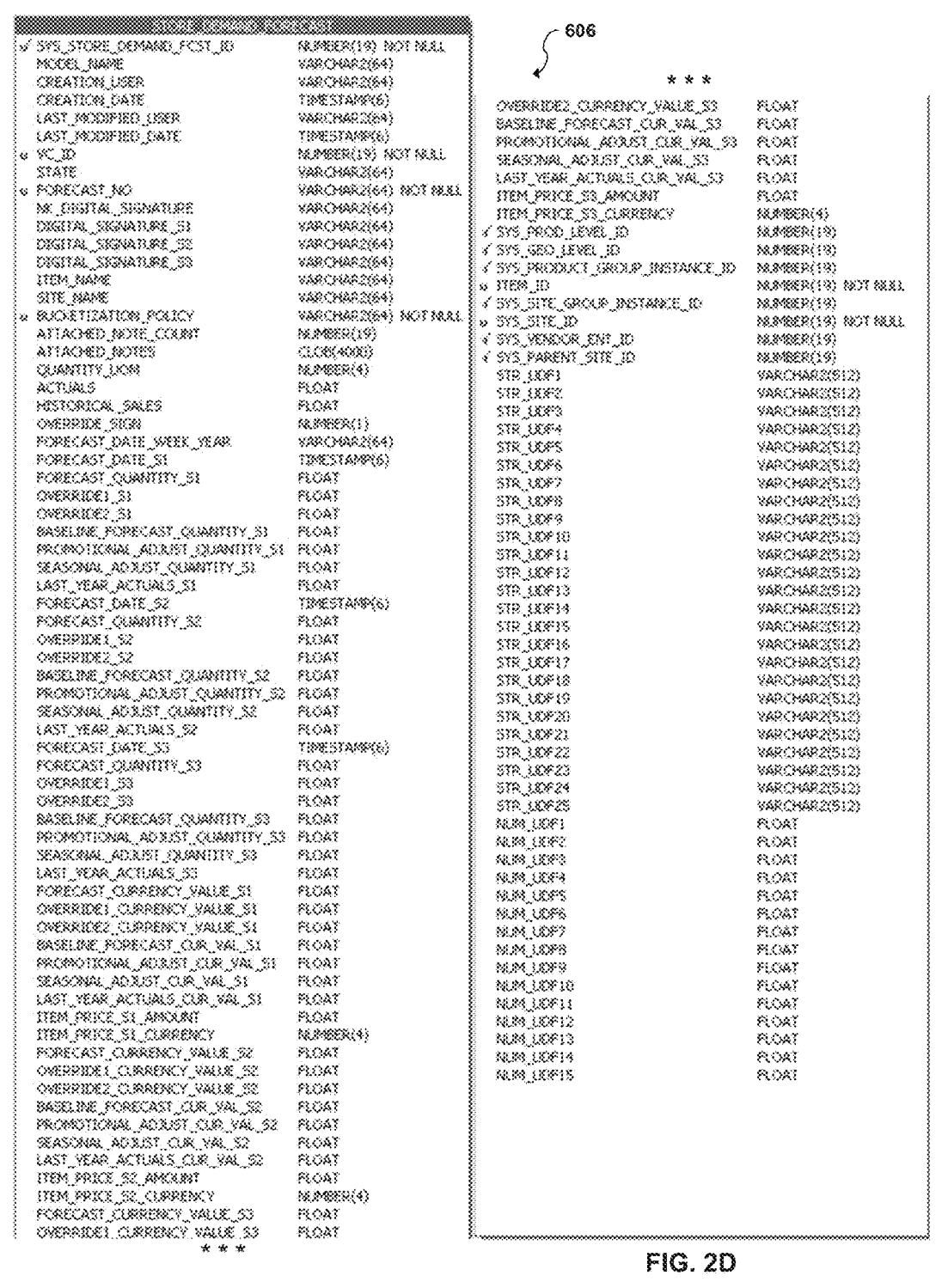
Figure 2F:
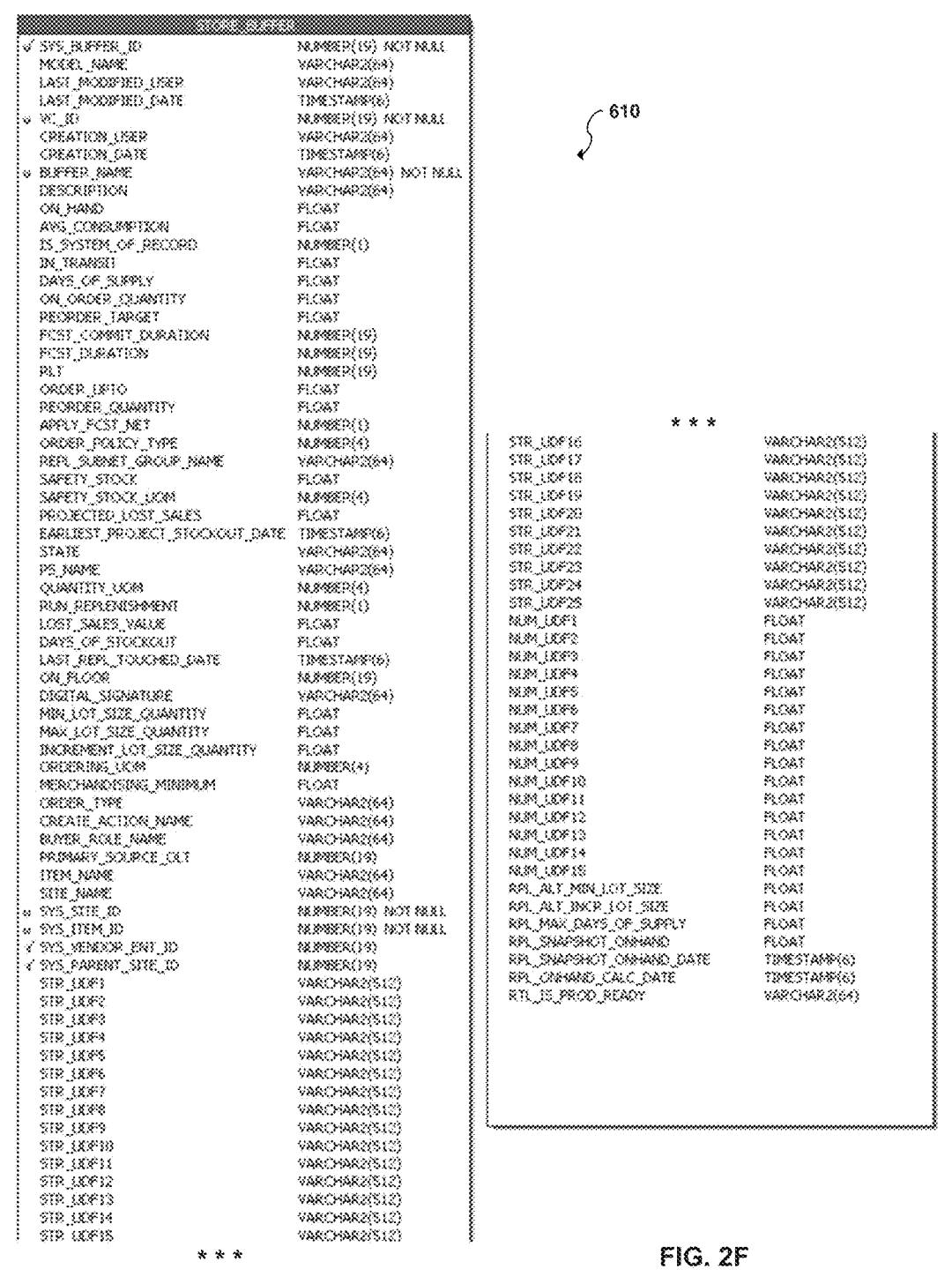

FIGS. 2A-2F illustrate exemplary database tables used by continuous forecasting in accordance with an embodiment of the present invention;

DETAILED DESCRIPTION THE PREFERRED EMBODIMENTS

Figure 1A:
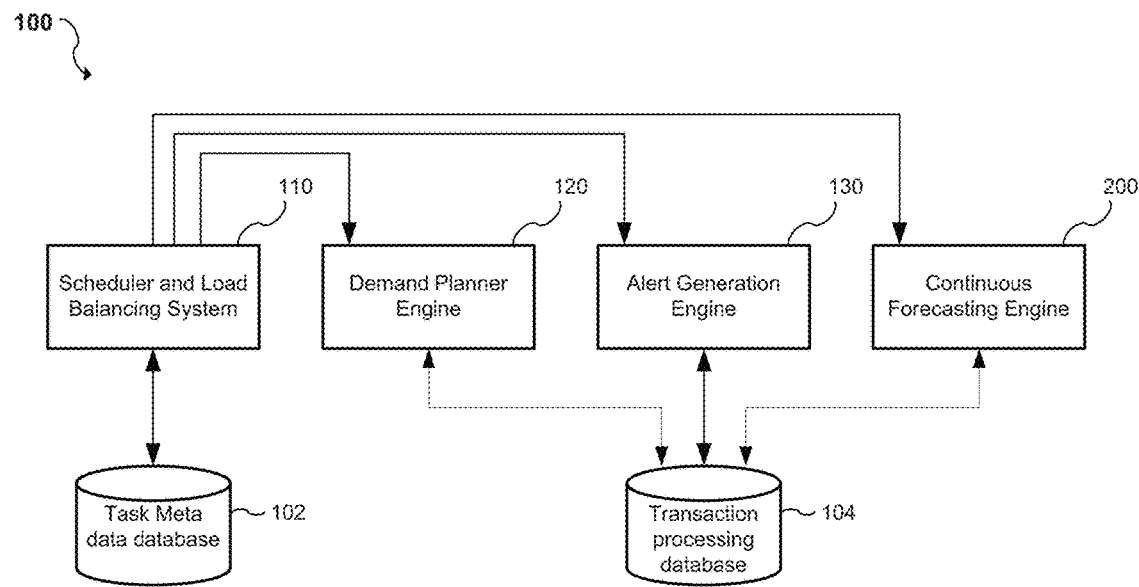
FIGS. 1A-1F are flow charts illustrating a method for continuous forecasting in accordance with an embodiment of the present invention.
Figure 1B:
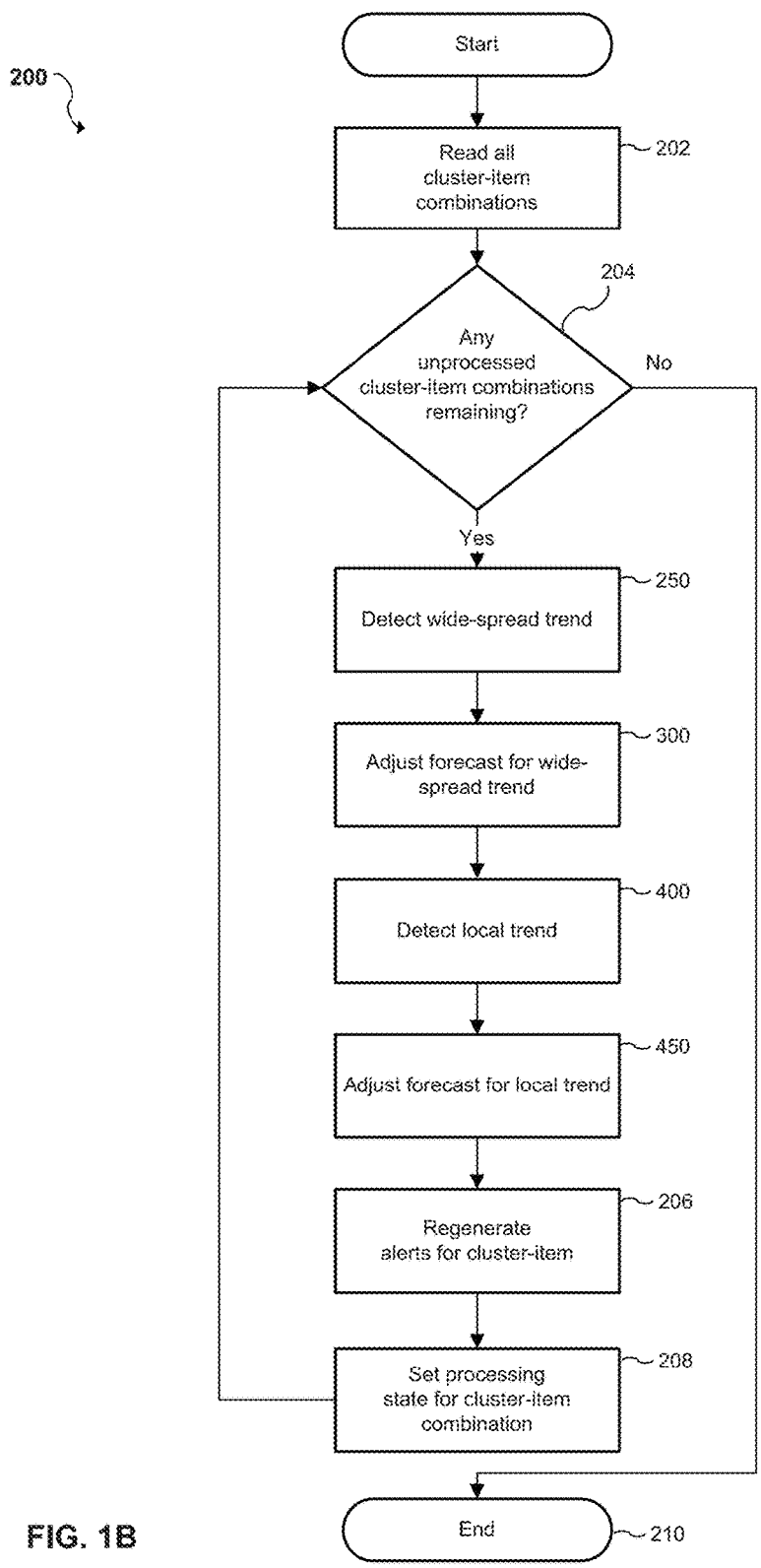

Referring now to the drawings, wherein like reference numerals designate identical or corresponding parts throughout the several views, preferred embodiments of the present invention are described.

The present invention utilizes adjusts a sales forecast by analyzing forecasting anomalies in a store, across a cluster (as defined below) or other geographic area, or within a configurable grouping as well as the patterns of anomalies and trends within a pre-defined or configurable period of time (e.g., without limitation, a week).

Information relevant to forecasting, including, without limitation, sales information, product information, store information and geographic information is periodically received by the present invention. This information may be received using any frequency and by any communication means. For instance, the information may be received in near real-time as the sales occur, hourly, daily, weekly or in any other predefined or configurable frequency. Multiple computer applications in communication over a computer network may be utilized to communicate this information. It is to be understood, however, that the information may be received manually or automatically by any means within the scope of the present invention.

Figure 3A:
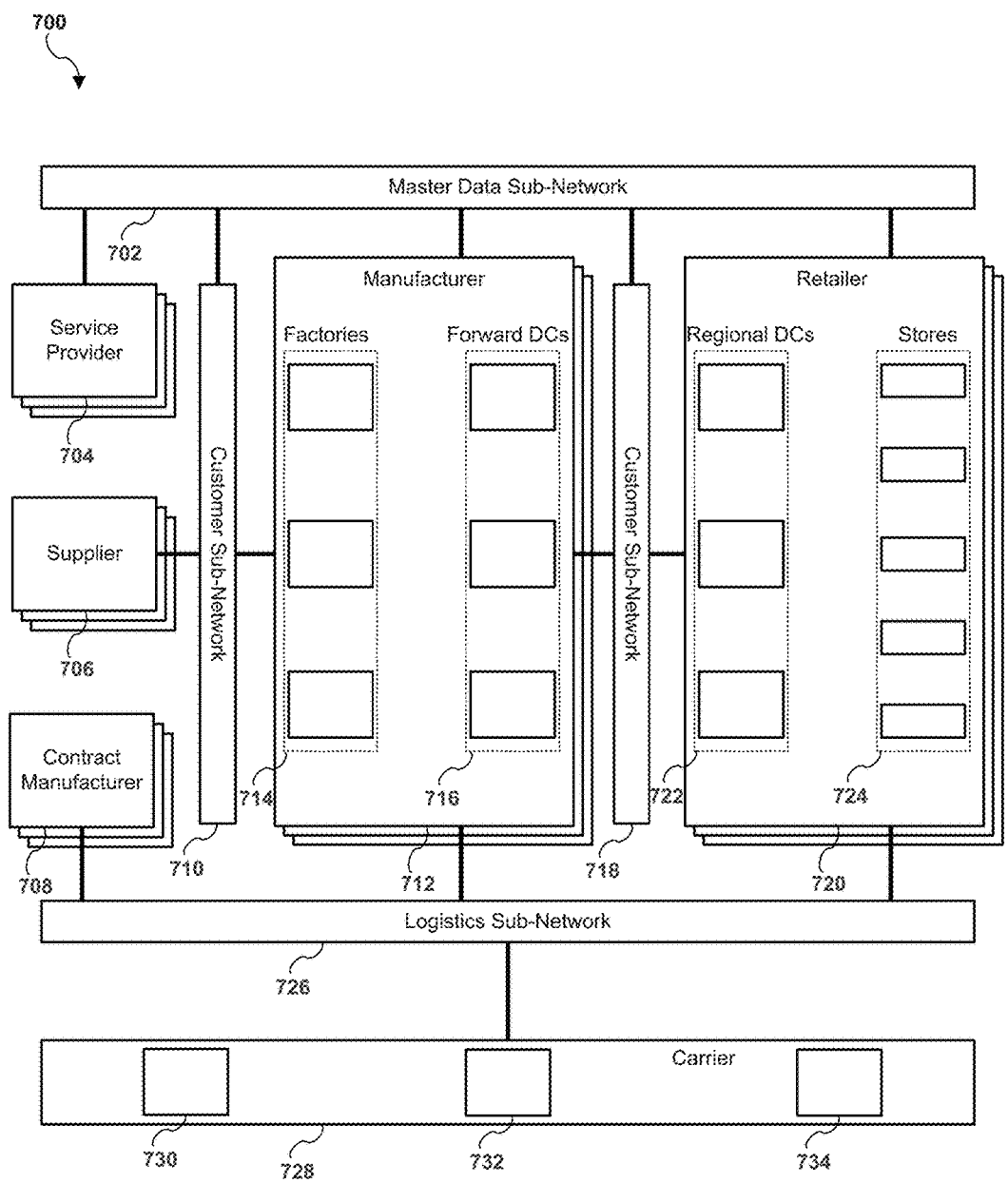
FIGS. 3A-3B are block diagrams illustrating exemplary sub-networks used in a supply chain in accordance with an embodiment of the present invention.
Figure 3B:
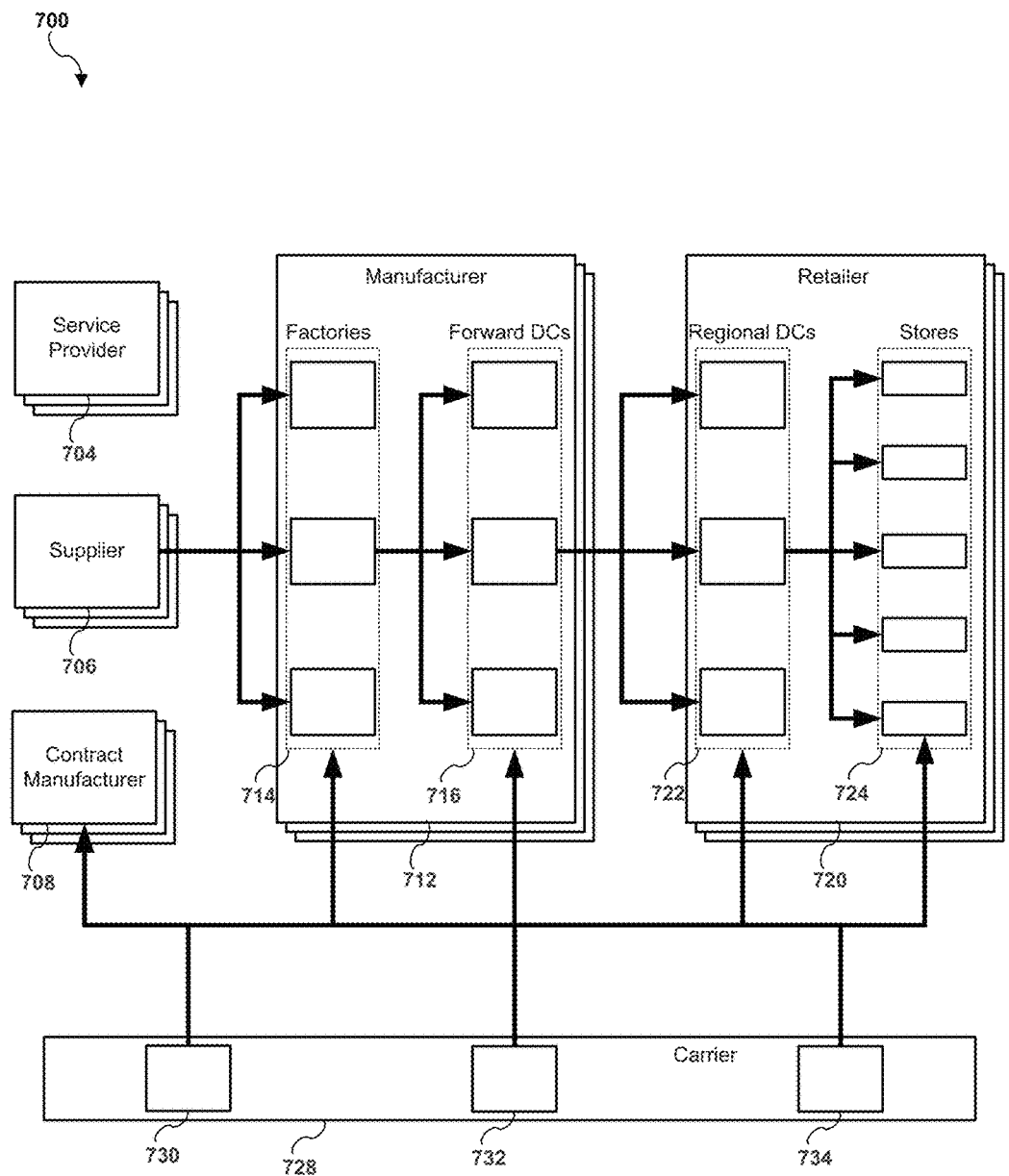

According to one possible non-limiting implementation, the present invention may be implemented in a supply chain in which a single enterprise or multiple enterprises communicate and share information over a computer network. Referring to FIGS. 3A and 3B, block diagrams illustrating exemplary sub-networks used in a supply chain in accordance with an embodiment of the present invention are shown. A common network environment may include a many-to-many network of enterprises in which any enterprise can execute business processes with any other enterprise of the network. The common network environment may include multiple sub-networks overlaid. According this implementation, information relevant to forecasting is periodically received over one or more networks or sub-networks similar to the exemplary configuration shown in FIGS. 3A and 3B. The information may be communicated between computer applications by any means, including, without limitation, messaging, an enterprise service bus, and the like within the scope of the present invention. One or more databases may be updated based on the received information.

According to at least one embodiment of the present invention, actual sales information, store information, distribution channel information, product information, geographic information, and the like is received and processed by a continuous forecasting engine:

According to at least one embodiment of the present invention, several hierarchies may be utilized in forecasting, including, without limitation, a product hierarchy, a geographic hierarchy, an account hierarchy and a calendar hierarchy.

The product hierarchy is a hierarchical grouping of products:

Product Hierarchy

| Order of Precedence | Name | Description |
|---|---|---|
| 1 | department | Department where the product is stocked. For example, a Grocery is a department. |
| 2 | sub-department | Sub department is a grouping of products within a department. For example, a Bakery could be a sub-department under a Grocery. |
| 3 | commodity code | Commodity code represents a class or products. An example of a commodity code is Dairy Products. |
| 4 | brand | A brand of products. |
| 5 | product or SKU or item | A specific product that is sold. |

The geographic hierarchy is a hierarchical grouping of geographical areas:

Geographic Hierarchy

| Order of Precedence | Name | Description |
|---|---|---|
| 1 | enterprise | An entity representing the company as a whole across all geographies. |
| 2 | DC | Distribution center. |
| 3 | cluster | A cluster of stores. |
| 4 | store | A distinct retail entity. |

The account hierarchy is a hierarchical grouping of distribution channels:

Account Hierarchy

| Order of Precedence | Name | Description |
|---|---|---|
| 1 | enterprise | In this context, the entity that owns the retailer company. |
| 2 | subsidiary | A sub-division or a business unit of a retailer company. |
| 3 | subsidiary sub-level | A further sub-division of the subsidiary typically by geography. |

During forecasting historical data is pulled and organized level in the calendar hierarchy (such as week), and forecasts are generated for a configurable horizon period in the same level (such as 13 weeks in future). The calendar hierarchy is a hierarchical grouping of time units:

Calendar Hierarchy

| Order of Precedence | Name | Description |
|---|---|---|
| 1 | year | Year component of the date. For example, 2010. |
| 2 | quarter | The quarter to which a date belongs. Companies typically will define which weeks fall into which quarter. There are also standard calendars such as ISO calendars and Gregorian calendars that do the same. |
| 3 | month | Month to which a date belongs. Companies may choose a custom calendar. |
| 4 | week | Week to which a date belongs to. Companies may choose to have a custom start of week or use a standard calendar. For example, some companies |

-continued

Calendar Hierarchy

| Order of Precedence | Name | Description |
|---|---|---|
| | | will choose Sunday as the start of the week rather than Monday. |
| 5 | day | Day component of the date. |
| 6 | hour | Hour within the day where the date belongs to. |

The fields of these hierarchies may be combined and when combined, refer different levels used in forecasting by the present invention. For instance, a cluster-item combination refers to each item in the product hierarchy within each cluster in the geographic hierarchy. The present invention can generate forecasts at different levels. For example, forecasts can be generated at, without limitation, the cluster-item level or the SKU-store-day level.

It is often important to share the most current information between computer applications over a computer network. Information may be shared between computer applications using either (a) a single version of the truth, or (b) multiple versions of the truth. As used herein, a "single version of the truth" is an arrangement in which the same data in its most current/updated form is accessible by multiple computer applications and/or multiple parties. In order to maintain a single version of truth, any single data element is generally represented in a single location. Conversely, multiple versions of the truth are stored in multiple locations. However, in situations where there are multiple versions of the truth, each of the locations must be updateable simultaneously. Otherwise, by definition, there are at least temporary inconsistencies with respect to the representation of the data. In that case, the information may or may not be the most current. In practice, multiple versions of the truth with simultaneous updating is generally not feasible and a non-stale system cannot be built on such a representation. According to at least one embodiment of the present invention, a single version of the truth is utilized for at least a portion of the information relevant to sales forecasting.

The present invention may utilize or more computer applications. As used herein, a "computer application" is a computer executable software application of any type that executes processing instructions on a computer or embedded in a processor, and an "application" or "application project" are the files, objects, structures, database resources and other resources used in integrating a computer application into a software platform.

Forecasts are adjusted based on received information. According to at least one embodiment of the present invention, a product-store-day forecast is adjusted by analyzing forecasting anomalies across a cluster as well as the patterns of anomalies at a store within a configurable period of time. Stores or other retail entities may be organized into a group, known as a "cluster." According to one embodiment of the present invention, a cluster is a group of stores (or other retail entities) having one or more common characteristic, such as, without limitation, stores within a geographic area. Stores that are grouped into a cluster commonly have a high correlation in sales volumes, patterns and products sold. Such correlation is often found in, without limitation, neighborhood stores, convenience stores, flagship stores, and the like. It is understood, however, that clusters are not limited to these types of stores and that the above list is provided for exemplary purposes.

According to at least one embodiment of the present invention, statistically generated product-store-day sales forecasts and actual sales are analyzed in at least near real-time as the sales occur. According to other embodiments, this analysis occurs on a daily, weekly, bi-monthly, monthly or some other predefined or configured frequency. Based on this analysis, anomalies such as, without limitation, forecast deviations, overstocks, stock-outs, and the like may be detected. For each detected anomaly, each cluster having an anomaly is examined to see if the anomaly is localized to a specific store, a relatively small number of stores, or to a wide-spread trend. Retail sales trends typically appear, without limitation, within clusters, and may be a reaction to one or more events. Events, include, without limitation, the following:

Events

| Name | Description |
|---|---|
| promotion events or advertising events | A promotion event is associated with a lowering of product price and advertisements of the same through mail or other medium. |
| marketing events | A marketing event is associated with the marketing of a new feature or a new product or a new application of the product. Sometimes this could include bonus packs such as buy one product and get a sample of another. |
| coupon events | A marketing event is associated with coupons printed in newspapers, mailings or online. Coupons are incentives to get the customer to the store to purchase the product. |
| temporary price reduction events | A temporary price reduction event is associated with a temporary reduction of price to give shopper incentive to purchase the product. In most cases, this type of event does not include much advertisements or campaigns to educate consumers about the price change. |
| local store events | A local store event is associated with a store running specials that are specific to that store. Typically, this happens when the store is overstocked on a type of product. For example, price mark downs on aging produce products. |
| payroll events | A payroll event is associated with the day(s) people get paychecks because sales tend to rise on these days. For example, the first of the month. |
| disaster events and weather related events | A disaster event or weather related event is associated with unanticipated events that can affect sales. For example, the area may be affected by a hurricane. |

Retail sales trends may be, for example, a reaction to a particular marketing event or a weather related event in the area.

The present invention includes a classifier that classifies anomalies in forecast computations as either wide-spread trends, local trends, or no trend (i.e., noise). Anomalies are also referred to herein as alerts. A trend may either be an up-trend or a down-trend. If actual sales are greater than the anticipated forecast sales, then there may be an up-trend. Otherwise, if actual sales are less than the anticipated forecast sales, then there may be a down-trend.

According to at least one embodiment of the present invention, alerts, including, without limitation, buyer related alerts and store related alerts, are utilized in forecasting.

Buyer related alerts include, without limitation:

| Buyer Related Alerts | |
|---|---|
| Name | Description |
| DC Stockout | Alerts if the distribution center is stocked out of a product - i.e., the BOH (balance on hand) at the distribution center <=0. |
| DC Projected Stockout | Alerts if the distribution center is projected to stock out within a definable threshold of days. |
| DC Overstock | Alerts if the distribution center is overstocked or contains more than a definable threshold of inventory in days. |
| Sales Trends | Alerts products that are showing increase/decrease in sales by a definable threshold. |
| Forecast Deviation - DC level | Forecast deviation from previously computed forecast at the distribution center level. |
| Forecast vs Sales DC Level - Weekly | Alerts if the forecast deviates from Sales aggregated at the distribution center level weekly through a definable threshold. For example for all stores in the distribution center a product is forecasted to sell 100 cases but if they sell only 20 cases then an alert will be generated. |
| Forecast vs Sales DC Level - Daily | Alerts if the forecast deviates from sales aggregated at the distribution center level daily through a definable threshold. For example, for all stores in the distribution center a product is forecasted to sell 100 cases in a day but if they only sell only 20 cases then an alert will be generated. |
| Forecast Accuracy - Aggregate/DC Level | Alerts if the forecast accuracy is going down. |

Store related alerts, include, without limitation:

| Store Related Alerts | |
|---|---|
| Name | Description |
| Store Stock Outs | Alerts on the actual stock out (no product availability) at the store. |
| Store Projected Stock Outs | Alerts on the projected stockouts. |
| Store Overstocks | Alerts on excessive inventory. |
| Promotional Alert | Alerts of an upcoming promotion at the store. |
| Event Forecast Deviation | Alerts on forecast deviation during an event. |
| Phantom Inventory | Alerts on phantom inventory. This is inventory that appears to exist for the system but doesn't really exist. |
| Negative BOH | Alerts negative balance on hand. For example, a shelf contains negative units of a product. |
| ISO Special Order | Alerts on the creation of a special order. |
| Potential DC Scratch | Alerts of a potential distribution center scratch in which the distribution center possibly will not be able to fulfill an order. |
| DC Scratch | Alerts of an actual distribution center scratch in which the distribution center canceled or lowered the quantity of a store order. |
| Forecast Deviation - Store Level | Forecast deviation at the store level. Compares forecasts vs previous forecast at the store level. |
| Forecast vs. Sales Weekly Deviation at Store | Forecast vs Sales deviation at the store level - weekly bucket. |
| Forecast vs Sales Daily Deviation at Store | Daily deviation of forecast vs sales at the store level. |

According to at least one embodiment of the present invention, a decision tree classifier is utilized to classify trends as either wide-spread or local. The decision tree classifier includes advanced data analysis techniques (including construction of decision tree classifiers and nearest neighbor) that make use of the difference between advancer and decliner counts, minimum sales thresholds, the number of trend reversals in a period, and any trend persistence. These are used to detect and eliminate noise, and to discern a smoothing factor that is applied to lift or drop the forecast.

A smoothing factor is then calculated and applied to the forecast. In the event of a wide-spread trend, a smoothing factor is calculated as the ratio of the cumulative forecast to cumulative sales within the period of the anomaly in the cluster (or other geographic region) where the anomaly occurred. In the event of a local trend, a smoothing factor is calculated that effectively makes the forecast exponentially converge to the trend as the trend continues to occur. Optionally, a custom user-defined calculation for the smoothing factor may be plugged in by a user. The forecast is then recalculated based on the smoothing factor resulting in a more accurate forecast.

Forecasting may either be run continuously or configured to run at scheduled intervals. Each run monitors the latest anomalies.

According to at least one embodiment of the present invention, a middle-out forecast is generated at a DC-product level that is further disaggregated at a store-item-day level using historical splits and patterns, where "DC" refers to a distribution center or warehouse. The forecast is referred to as a middle-out forecast because the forecast uses fields near the middle of the respective hierarchies. Such disaggregation may be utilized because a middle-out statistical forecast alone may not be sufficient to rapidly react to changes in sales trend. The function of rapidly reacting to on-going trends is handled at the bottom product-store-day level. The adjustments made to the bottom product-store-day level forecast are then propagated upwards to the distribution center and ultimately to the vendor through back propagation of demand.

The present invention includes a continuous forecasting engine that may be used to override forecasts. Overrides, include, without limitation:

Overrides

| Order of Precedence | Name | Description |
|---|---|---|
| 1 | Continuous Forecasting Override | A continuous forecasting override is an override the continuous forecasting engine places - i.e., a newly calculated forecast. |
| 2 | Store override | A store override is an override that the user at a store typically places on the forecasts - this happens when the user at the store has advance knowledge of an event that is likely to affect their store. |
| 3 | Replenishment Analyst override | A replenishment analyst override is an override that a supply chain analyst at the Division or DC typically will place. The vendor of the product will collaborate with the retailer supply chain analyst in the process of placing this override. The system allows for them to collaborate on this override. |
| 4 | Corporate override | A corporate override is an override that a person from corporate (typically Head Quarters) typically places. |

According to at least one embodiment, a store override is placed before the start of the week and is further adjusted by a continuous forecasting override. A replenishment analyst override is placed for a 2-6 week period and a corporate override is placed on a quarterly basis.

According to at least one embodiment of the present invention, a model, referred to as "CFScenario," contains the parameters related to a continuous forecasting engine run. The inputs to the model include, without limitation, the following:

retail alerts having an alert type equal to "Store Daily Forecast Vs Sales Deviation" from the start of the week to the current day;

events (promotions, temporary price-drops) associated with the products that have deviations.

store point of sales ("POS") beginning from the start of the current week to the day before the current day;

store weekly demand forecasts for the current week (distribution center level forecasts as well, overrides will get propagated bottom-up to distribution center level);

daily split ratios;

parameters (detailed below); and special exclusion filters (detailed below).

Certain parameters may be specified at several levels bottom up or middle out or top down. For example, parameters may be specified for each item-store which take precedence over another specification that may happen at an item-DC. Typically, fine grained level parameters override higher level overrides. Parameters that control continuous forecasting include, without limitation, the following:

WSMinSalesThreshold: The minimum threshold of sales to be considered for WS trend analysis (e.g., 4). If the sales for a product are less than the WSMinSalesThreshold then it is not considered for trend analysis.

WSMaxUpOverrideRatio: The upper limit of the override that will be placed initially when a trend is detected (e.g., 0.5). The CF engine will not override (i.e., create a new forecast) by an amount higher than the current forecast times this ratio. For example, if WSMaxUpOverrideRatio is set to 0.5 and current forecast is 100, then the maximum override will be 150 for the initial override. This ratio is used to control extreme reaction to trends when they are initially detected. However, if the sales continue to surge then the exponential convergence will occur and pick to trend. This factor only applies to the first time a wide spread override is placed.

WSMaxDownOverrideRatio: Sets the lower limit of the override, very similar to WSMaxUpOverrideRatio, but in the opposite direction.

MinLocalTrendDurationThreshold: The minimum duration for which a trend has to occur to be considered as a local trend.

LocalTrendMaxUpOverrideRatio: The upper limit on a local trend forecast override.

LocalTrendMaxDownOverrideRatio: The lower limit on the local trend forecast override.

Special exclusion filters are known supply chain system events that impact sales. Unlike user planned promotions or the like, special exclusion filters are execution events in the supply chain. Special exclusion filters include, without limitation, power outages, road closures, spillage, wastage and the like. Such events directly cause the inventory level to go down and trigger several system alerts such as DC projected stock out or DC stock out. When such a known system/supply chain alert (event) occurs, the continuous forecast engine does not process the forecast for the related objects that participate in the event. For example, if two products are stocked out at a distribution center due to a truck spill or accident. Because the products are stocked out at the distribution center overtime, the products will not be replenished at the store shelves and the stores will stockout. When the system looks at sales versus forecasts counts, a determination is made that sales are having a down trend incorrectly if there was no exclusion filter. In this example, a DC stockout alert is identified as an exclusion filter, such that when this occurs, the continuous forecasting engine will not touch the forecasts for the products that are stocked out at the DC till that condition goes away. Special exclusion filters include, without limitation, the following:

WSSignalNoiseRatio: Wide spread trend signal to noise ratio. This parameter helps to remove noise while wide spread trend detection.

WSTrendConfirmationRatio: The ratio of number of stores that need to participate in a trend to the total number of stores in cluster in order to be considered as a wide spread trend.

LocalSignalNoiseRatio: Ratio of number of alerts in the trend direction to those in the opposite direction.

LocalTrendConfirmationCount: The number of alerts at the local level to be considered as a local trend.

Daily forecasts are updated based on output from the model. If there is an event associated with a forecast deviation, then the daily forecasts for the period of time in which the end of the event occurred will be updated. Otherwise, the daily forecasts from the current day to the start of next week will be updated.

The continuous forecasting engine updates a continuous forecast override on the daily forecast. A daily store demand forecast override (one type of "continuous forecast override") having a higher precedence compared to a store or division override, may be created based on output from the model.

According to at least one embodiment of the present invention, at least two weeks (14 days) of daily forecasts are created and maintained in a database table, referred to as the "store_demand_forecast" table. It is to be understood, however, that the present invention is not limited to 14 days of daily forecasts, and that any number of daily forecasts may be created and maintained within the scope of the present invention. The creation and/or update of these daily forecasts may occur each time the continuous forecasting system is run, on a daily schedule, or at another user-defined frequency. When a daily forecast is updated, the corresponding weekly forecast is preferably recomputed. A standard replenishment ("SR") or an advanced replenishment ("AR") may also be updated based on the daily forecasts. A standard replenishment is the module that places orders from Store-DC based on forecasts. An advanced replenishment relates to multitier replenishment from store forecasts all the way to suppliers.

The continuous forecasting engine may be run at anytime or on any pre-defined or user-defined scheduled. The forecasting engine could be configured to run, for example, daily after an alert engine for an appropriate alert type (e.g., a "Forecast vs Sales Daily Deviation at Store") completes its execution. For instance, the forecasting engine could be configured to run at 7:00 am immediately following an alert run at 7:00 am.

As used herein, a "period" is typically the time duration from the start of a continuous forecast engine run to the end of the current forecast period. The end of the period may also be defined by an event, such as, without limitation, an advertisement event, a temporary price reduction event, or a local event. If an event occurs, then the end of the period may be the end date of the event. For example, if a weekly forecast is run on Sunday (i.e., Sunday-Saturday), then the period the period would normally end on Saturday unless there is an event. As another example, if a forecast is run once every two weeks, then the period will be the time between the runs of the continuous forecasting engine.

For each item within each cluster (an cluster-item combination), the present invention analyzes each alert and determines where there is a wide-spread trend, a local trend or no trend. As used herein, "wide-spread trend detection period" refers to the duration of a wide-spread trend within a period. The wide-spread trend period begins at the start of the wide-spread trend and continues to the end of the wide-spread trend or the current time if the trend has not ended. As used herein, "local trend detection period" refers to the duration of a local trend within a period. The local trend detection period begins at the start of the local trend and continues to the end of the local trend or the current time if the trend has not ended.

Wide-Spread Treads

According to at least one embodiment, deviations are weighted.

EXAMPLE 1

Assume that there are: (a) 100 stores within a distribution center (DC) or cluster; (b) there are 50 alerts with a positive deviation from 22 distinct stores within the distribution center (DC) or cluster and that out of these 50 alerts, 10 are severe alerts and 40 are minor alerts (where severity is determined by the amount of sales deviation from forecast, in other words 10 occurrences are real big deviations and 40 are small deviations relatively); (c) there are 30 alerts with a negative deviation from 10 distinct stores within the distribution center (DC) or cluster; (d) WSTrendConfirmationRatio is equal to 0.22; and (e) SignalNoiseRatio is equal to 2.

This is a wide spread trend.

However, when the smoothing index is computed to update the forecast instead of purely taking the cumulative sales/cumulative forecasts across all stores, there is a grouping by severity. In other words, the stores that are part of the 10 severe alerts should receive a higher forecast adjust compared to the stores that are part of the 40 minor deviations.

Smoothing index for a given store-item is therefore computed as cumulative sales/cumulative forecast only considering the stores that have deviations that are weighted the same.

A wide-spread trend typically spans a cluster or a distribution center geographic area. According to at least one embodiment of the present invention, a wide-spread trend has occurred if two conditions are satisfied. For a wide-spread up-trend, the first condition is true if the number of stores within a cluster or distribution center with a positive deviation since the beginning of the wide-spread trend detection period (e.g. a week) divided by the total number of stores in the cluster or distribution center is greater than a configurable trend confirmation ratio (known as the "WSTrendConfirmationRatio"). WSTrendConfirmationRatio is an estimate the wideness of the trend distribution. Deviations are identified by alerts having a "Store Daily Forecast Vs Sales Deviation" alert type. The second condition is true if the number of stores within the cluster or distribution center with a positive deviation since the beginning of the wide-spread trend detection period (e.g., a week) divided by the number of stores within the cluster or distribution center with a negative deviation since the beginning of the wide-spread trend detection period is greater than a configurable noise ratio (known as the "SignalNoiseRatio"). SignalNoiseRatio is used to reject cases where there is too much noises.

For a wide-spread down-trend, the first condition is true if the number of stores within a cluster or distribution center with a negative deviation since the beginning of the wide-spread trend detection period (e.g., a week) divided by the total number of stores in the cluster or distribution center is greater than the WSTrendConfirmationRatio. The second condition is true if the number of stores within the cluster or distribution center with a negative deviation since the beginning of the wide-spread trend detection period (e.g., a week) divided by the number of stores within the cluster or distribution center with a positive deviation since the beginning of the wide-spread trend detection period is greater than the SignalNoiseRatio.

EXAMPLE 2

The forecasting engine is run on Tuesday. It identifies all alerts having an alert type of "Store Daily Forecast Vs Sales Deviation" for Sunday, Monday, Tuesday, which have a positive deviation from the forecast, and all alerts which have negative deviation. Assume that there are: (a) 100 stores within the distribution center (DC) or cluster; (b) there are 50 alerts with a positive deviation from 22 distinct stores within the distribution center (DC) or cluster; (c) there are 45 alerts with a negative deviation from 15 distinct stores within the distribution center (DC) or cluster; (d) WSTrendConfirmationRatio is equal to 0.2; and (e) SignalNoiseRatio is equal to 2.

The first condition would be satisfied (22/100>0.2), but the second condition would not be satisfied (22/15<2). This would be considered noise or a no-trend situation.

EXAMPLE 3

The forecasting engine is run on Tuesday. It identifies all alerts having an alert type of "Store Daily Forecast Vs Sales Deviation" for Sunday, Monday, Tuesday, which have a positive deviation from the forecast, and all alerts which have negative deviation. Assume that there are: (a) 100 stores within the distribution center (DC) or cluster; (b) there are 50 alerts with a positive deviation from 22 distinct stores within the distribution center (DC) or cluster; (c) there are 30 alerts with a negative deviation from 10 distinct stores within the distribution center (DC) or cluster; (d) WSTrendConfirmationRatio is equal to 0.2; and (e) SignalNoiseRatio is equal to 2.

The first condition would be satisfied (22/100>0.2), and the second condition would also be satisfied (22/10>2). This would be considered a wide-spread up-trend.

Local Trends

A local trend is typically a trend within a store. According to at least one embodiment of the present invention, if only one item, or a small number of items, within a store indicate a forecast deviation, then this is likely to be noise. However, if the item, or small number of items, is consistently deviating within the store by a certain threshold number of days from the forecast within a configurable period (e.g., a week), then there is a local trend and the weekly forecast should be adjusted. This is known as an exponential convergence. An exponential convergence to a trend means that as the trend persists, the forecast will converge to it exponentially (i.e., convergence occurs slowly at first and then very rapidly). For example, if on day three, a local trend is detected, there may not be full confidence in the local trend, but if the local trend continues into the next day (day four), then confidence in the local trend that was detected in day three increases exponentially.

If the item in the store is consistently deviating by a predefined or configurable threshold number of days (known as the "localforecastTrendDetectionThreshold"), from the forecast (e.g., the item in the store consistently deviates for 3 or more days), then there is a local trend and the weekly forecast must be adjusted. It instead, within the period, the forecast trends above and below sales erratically (defined by "minTrendReversalsForNoiseDetection"), then there is no trend.

If the number of deviations in the same direction (either the positive deviations or the negative deviations) is greater than or equal to LocalTrendConfirmationCount AND the number of deviations in the same direction divided by the number of alerts deviating in the opposite direction is greater than or equal to LocalSignalNoiseRatio, then this is local trend. Local trends are typically processed for those stores that don't participate in a wide spread trend. In other words, if a store is part of a wide spread trend then it is not a "local" trend and it is not considered for such processing. However, local trends for stores that trend in a wide-spread trend direction are processed as a wide-spread trend.

Local Trend Detection Pseudo-code:

```
if day_of_week (starting from Monday = 0) <
MinLocalTrendDurationThreshold
    // exit because not enough time has elapsed from the start of the week
    // to process local trends.
else {
    // select all the stores under that the DC, and for each store also
    // retrieve all relevant local trend information.
    // for each store with suitable ratios, perform a store weekly forecasts
    adjustment.
    // exponentially converge the forecasts to the sales.
    override_ratio = cumulative_sales / cumulative_daily_forecast (for
    the item-store) new_overridden_forecast_qty =
        (current_forecast_qty) + (current_forecast_qty *
        override_ratio - current_forecast_qty) / 2
    // where "2" is a configurable parameter
}
```

Smoothing Index

A smoothing index is calculated and used to determine the increase or decrease of a forecast.

Adjusting Forecast Pseudo-code (for a Wide-spread Trend):

```
smoothing_index = average_cumulative_sales (from the start of the
period to the current day for all stores in the distribution center deviating
in the same direction) / average_cumulative_forecast (for all stores in the
distribution center deviating in the same direction (i.e., the main
result-trend direction));
for (i=today; i < period end: i++) {
    projected_daily_forecast[i] = (smoothing_index) *
    daily_forecast[i];
}
```

The noise is reduced by looking at cumulative numbers across all stores while computing the forecast adjustment factor.
Adjusting Forecast Pseudo-code (for a Local Trend):

```
// the trend is exponentially converged if it happens for several days
// (where i is the index for the day in the period).
projected_daily_forecast[i] = (cumulative_daily_sales /
        cumulative_daily_forecast) * daily_forecast[i];
diff[i] = projected_daily_forecast[i] - daily_forecast[i];
projected_daily_forecast[i] = daily_forecast[i] + diff[i] / 2;
smoothing index: NF(store, item, period) = OF(store, item, period) +
    [OF(store, item, period) * (cumulative_sales (for store-item during
    period of local trend) / cumulative_forecast (for store-item during
    period of local trend) - OF(store, item, period)] /
    exponential_convergence_factor
```

NF is a function that outputs the new forecast. OF is a function that returns the original forecast of the supplied store, item, and time period.
Slow Movers Slow movers have a lot of noise especially at a store level. Alerts that are generated for slow movers (less than minSalesPerWeekForNoise (e.g., 7 units)) will not be included unless the item has an event.
Slow Mover Pseudo-code:

```
for each item-store daily forecast deviation alert {
    if (sales for item-store < minSalesPerWeekForNoise) {
        // exit out of loop
    }
    trendType = trendClassifier.getTrendType(alert, rules);
    if (trendType is wide-spread trend) {
        // update daily forecasts based on the wide-spread
        // trend calculation.
    } else if (trendType is local trend) {
        //update daily forecast based on the local trend calculation
    } else {
        log noise;   // may be useful to maintain a count somewhere to
                     // we can classify products with a lot of noise.
    }
}
```

According to at least one embodiment of the present invention, tasks are created to be processed by various engines, including, without limitation, a "scheduler and load balancing system," a "demand planner engine," an "alert generation engine" and a "continuous forecasting engine." According this embodiment, the "scheduler and load balancing system" creates engine tasks to be processed by various engines. Task granularity and data filters are configurable, for instance, in the meta data layer. The engines identified by a task that are ready for execution are invoked. The "demand planner engine" generates weekly forecasts at configurable levels using statistical techniques. If an external system generates this forecast it can be directly entered into a database. The "alert generation engine" looks at data anomalies and creates alerts. The forecast alerts generated will contain information about actual sales and predicted forecast and percentage deviation. Policies and thresholds are definable. For example, the extent of the deviation before an alert is generated is definable. The "continuous forecasting engine" classifies each alert in a cluster using alert classifiers. Alerts are grouped based on either local trends specific to the alert or a wide-spread trend which transcend local boundaries and spans across the cluster. Smoothed forecast adjustments are then placed where needed.

An "online transaction processing database system" holds all data related to the forecasting and execution such as historical point of sale, events (promotions), weekly forecasts, daily forecasts, alerts, item master and site master.

The present invention can generate forecasts at the SKU-store-day level by analyzing POS (point-of-sale) data and applying causal information at various levels, A statistical forecast generation engine supports all standard statistical techniques as well automatic best fit detection. The generated forecast has seasonal and causal components built into it. The statistical forecast is then augmented with local demand estimates and propagated to various levels along the distribution, product and calendar hierarchies.

Further, the continuous forecasting engine may be operated daily at the SKU-store-day level and the forecasts may be adjusted continuously based on trends within the store and the trends within a cluster.

Statistical forecasts can be generated at any level. Bottom-up forecasting starts forecasting at SKU-store levels and aggregates the forecasts upwards. Top-down forecasting starts at the highest level, such as, without limitation, the commodity code-national level, and disaggregates the forecasts using splits calculated by analyzing historical POS. Middle-out forecasting starts at intermediate levels in the hierarchy and propagated forecasts upwards and downwards. The present invention supports all of the three variants as well as allows multiple scenarios, each using a different forecasting level for comparison.

According to at least one embodiment of the present invention, for retail forecasting, the aggregated SKU-store-week forecast is calculated at the distribution center (or division) level. That forecast is and disaggregated down to the Store-SKU-Day level using calculated split ratios. This is a middle-out approach. This approach leads to a better quality for retail forecasting as it minimizes noise that may happen at individual stores. For example, a store might sell more products than anticipated on a given day due to a random event, such as a consumer buying a large number of products for a party or some other one time function. Conversely, another store might sell fewer products than anticipated due to a spill or wastage. When POS data is aggregated upwards to the distribution center (or division) such noises in the data will get smoothed out and the trend detection is more accurate. Noise reduction is particularly important with volatile products, slow movers and promoted products. This technique also leads to better back propagated vendor forecasts as the distribution center (or division) level forecasts are highly accurate.

Advertisement events and temporary price reduction events typically are applicable to an entire distribution center or division. The historical POS data contains markers to identify when such events previously occurred. Future advertisement events and temporary price reduction events are received by the present invention. The price drop ratios are calculated and events are categorized into buckets of price drops. During statistical forecasting, the price drop percentage is compared to similar drops in history to discern the effect of the event in the future. In the forecasting algorithm detection phase, the present invention identifies the appropriate algorithm for a product based on the sensitivity it has to events and seasonality. For example, the effect of an event on a given product could be additive in nature (i.e., the increase is a fixed number of units). Another product could be highly reactive to events and the effect for that product could be multiplicative (i.e., the increase is a certain factor of the baseline). A trained demand planner can also optionally override the system and set the configuration for at the forecast level (SKU-DC for retail). Complex events can be configured to appropriately lift the forecast of all the associated products that are part of the event.

Stores may have local events that affect the store sales such as local festivals or construction. These causal factors can be received by the present invention, and during forecast generation phase for the individual store, these factors are taken into consideration. Stores may also enter demand change requests into future if they know that they will need extra product for example to cover a customer in-store order.

The generated forecast is available to distribution center replenishment analyst as well as a vendor VMI analyst or vendor CSR. All parties use a single version of the truth. Collaboration workflows allow for vendors and retailers to collaborate and establish a consensus forecast as well as promotions.

Event calendars allow for everybody from the store grocery manager to the vendor CSR to see the promotions, local events happening at a store or at a distribution center. Fine grained role based permissibility makes sure that only data that is authorized for a party is visible to them.

A split generation engine module within the present invention can be used to analyze historical POS data and infer wastage ratios based on sales patterns and markdowns. This wastage ratio will be fed to replenishment engine for predicting wastage and minimizing it. Markdown alerts can be generated by the present invention.

While introducing new products or replacing existing products with a different pack size or such, the demand planner is fed with data pertaining to one or more similar products that it needs to extrapolate off for the new product forecasting. Scaling factors are entered to scale the history of the similar product(s).

The continuous forecasting engine receives forecast vs. sales daily alerts as it occurs. Each alert that it received is categorized as a wide-spread trend, a local trend or noise. Wide-spread trends happen when several stores in a region start to show the same trend in forecast errors, for example an overselling promotion may happen at many stores in a distribution center. Local trends happen within a store or small set of stores, in these cases the forecast will exponentially converge to the trend with time.

Flowcharts Illustrating a Method for Continuous Forecasting

Referring to FIGS. 1A-1F, flow charts illustrating a method for continuous forecasting in accordance with an embodiment of the present invention are shown. As shown at block 202, items within a cluster (cluster-item combinations) are read. However, it is to be understood that reading and processing items within a cluster may be performed either collectively or individually within the scope of the present invention. For instance, according to one embodiment, all of the items within a cluster are read and buffered, and all of those items are then processed collectively. According to another embodiment, each item within a cluster is read and processed individually (or in a quantity smaller than all of the items within a cluster) in a loop.

At block 204, a determination is made as to whether all of the items within a cluster have been processed. If all of the items within a cluster have been processed, then processing continues at block 210. Otherwise, wide-spread trend detection occurs, as shown at block 250 and as further detailed in FIG. 1B.

At block 252, the number of positive deviations and the number of negative deviations from an existing sales forecast is determined and/or retrieved for all items in a cluster. Optionally, forecasting policies are retrieved for the cluster-item level, as shown at block 254. The forecasting policies include parameters used in forecasting, including, without limitation, WSTrendConfirmationRatio, minTrendReversalsForNoiseDetection, SignalNoiseRatio, localforecastTrendDetectionThreshold, minSalesPerWeekForNoise, LocalSignalNoiseRatio, minLocalTrendDurationThreshold, and LocalTrendConfirmationCount.

At block 204, a determination is made as to whether the number of stores within a cluster with a positive deviation since the beginning of the wide-spread trend detection period divided by the total number of stores in the cluster is greater than a configurable trend confirmation ratio.

$$\left(\frac{\text{nbr\_positive\_deviations}}{\text{nbr\_stores}}\right) > WSTrendConfirmationRatio$$

If the above equation is true, then processing continues at block 258. Otherwise, processing continues at block 262.

At block 258, a determination is made as to whether (a) the number of stores within a cluster with a negative deviation is equal to zero, or (b) the number of stores within the cluster with a positive deviation since the beginning of the wide-spread trend detection period divided by the number of stores within a cluster with a negative deviation since the beginning of the wide-spread trend detection period is greater than a configurable noise ratio.

$$\text{nbr\_negative\_deviations} = 0$$

OR $$\left(\frac{\text{nbr\_positive\_deviations}}{\text{nbr\_negative\_deviations}}\right) > SignalNoiseRatio$$

If the above equation is true, then processing continues at block 260. Otherwise, processing continues at block 400.

At block 260, a determination is made as to whether the number trend reversals since the beginning of the wide-spread trend detection period is greater than or equal to a configurable minimum number of trend reversals for noise detection.

nbr_trend_reversals>=minTrendReversalsForNoise Detection

If the above equation is true, then there is a wide-spread up trend and processing continues at block 400. Otherwise, processing continues at block 300.

At block 262, a determination is made as to whether the number of stores within a cluster with a negative deviation since the beginning of the wide-spread trend detection period divided by the total number of stores in the cluster is greater than a configurable trend confirmation ratio.

$$\left(\frac{\text{nbr\_negative\_deviations}}{\text{nbr\_stores}}\right) > WSTrendConfirmationRatio$$

If the above equation is true, then processing continues at block 264. Otherwise, processing continues at block 400.

At block 264, a determination is made as to whether (a) the number of stores within a cluster with a positive deviation is equal to zero, or (b) the number of stores within the cluster with a negative deviation since the beginning of the wide-spread trend detection period divided by the number of stores within a cluster with a positive deviation since the beginning of the wide-spread trend detection period is greater than a configurable noise ratio.

$$\text{nbr\_positive\_deviations} = 0$$

OR $$\left(\frac{\text{nbr\_negative\_deviations}}{\text{nbr\_positive\_deviations}}\right) > SignalNoiseRatio$$

If the above equation is true, then processing continues at block 266. Otherwise, processing continues at block 400.

At block 266, a determination is made as to whether the number trend reversals since the beginning of the wide-spread trend detection period is greater than or equal to a configurable minimum number of trend reversals for noise detection.

nbr_trend_reversals>=minTrendReversalsForNoise Detection

If the above equation is true, then there is a wide-spread down trend and processing continues at block 400. Otherwise, processing continues at block 300.

Figure 1C:
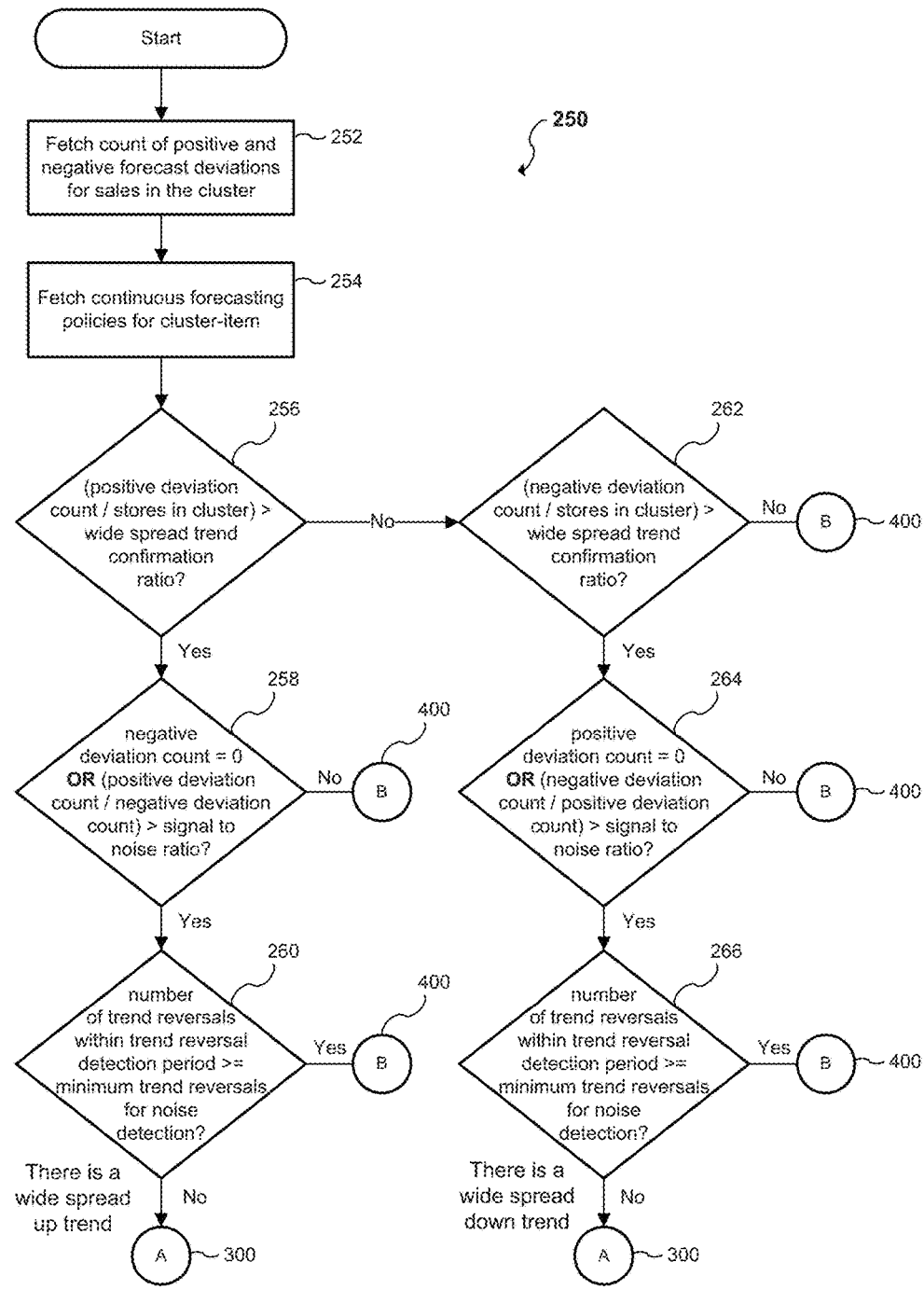
Figure 1D:
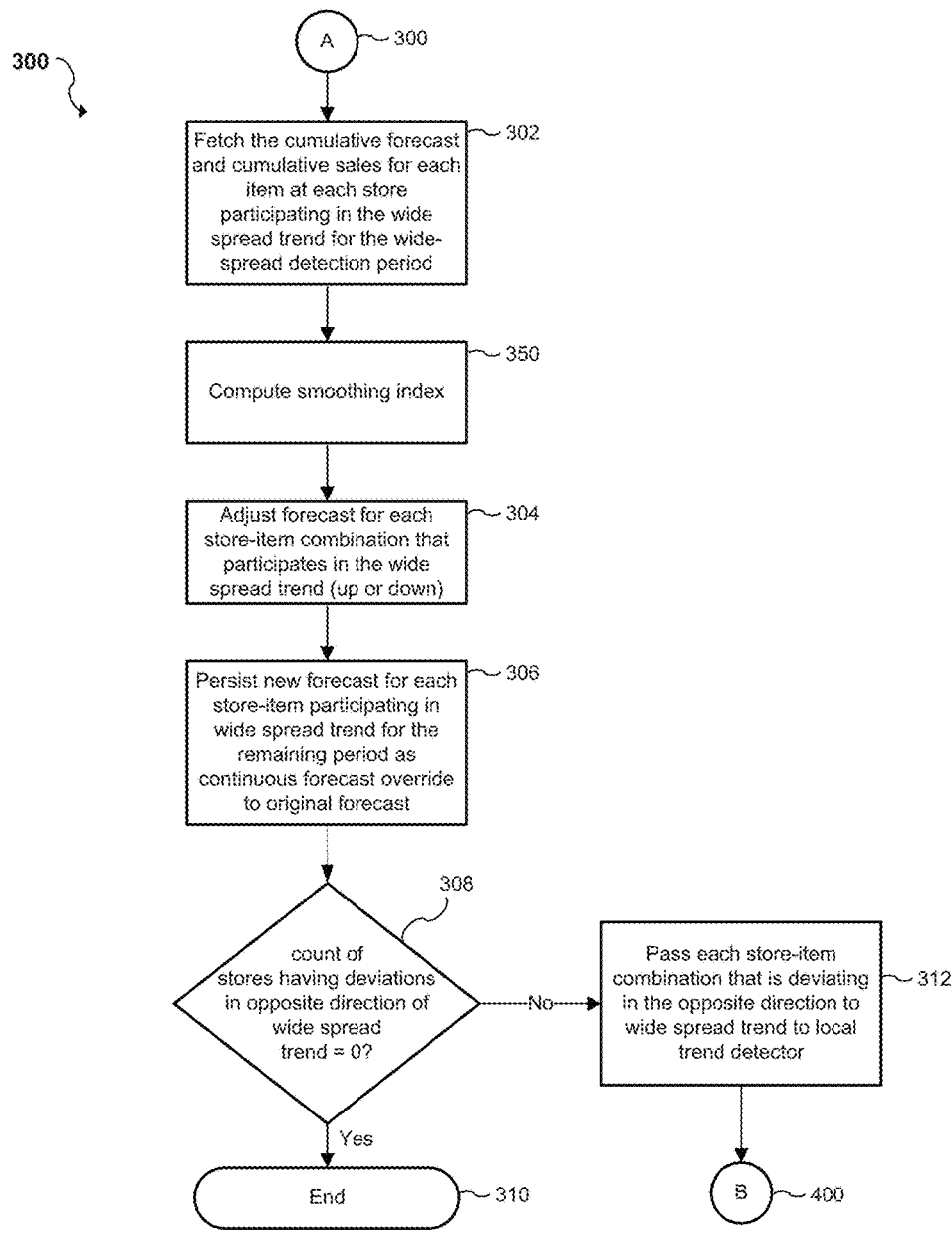
Figure 1E:
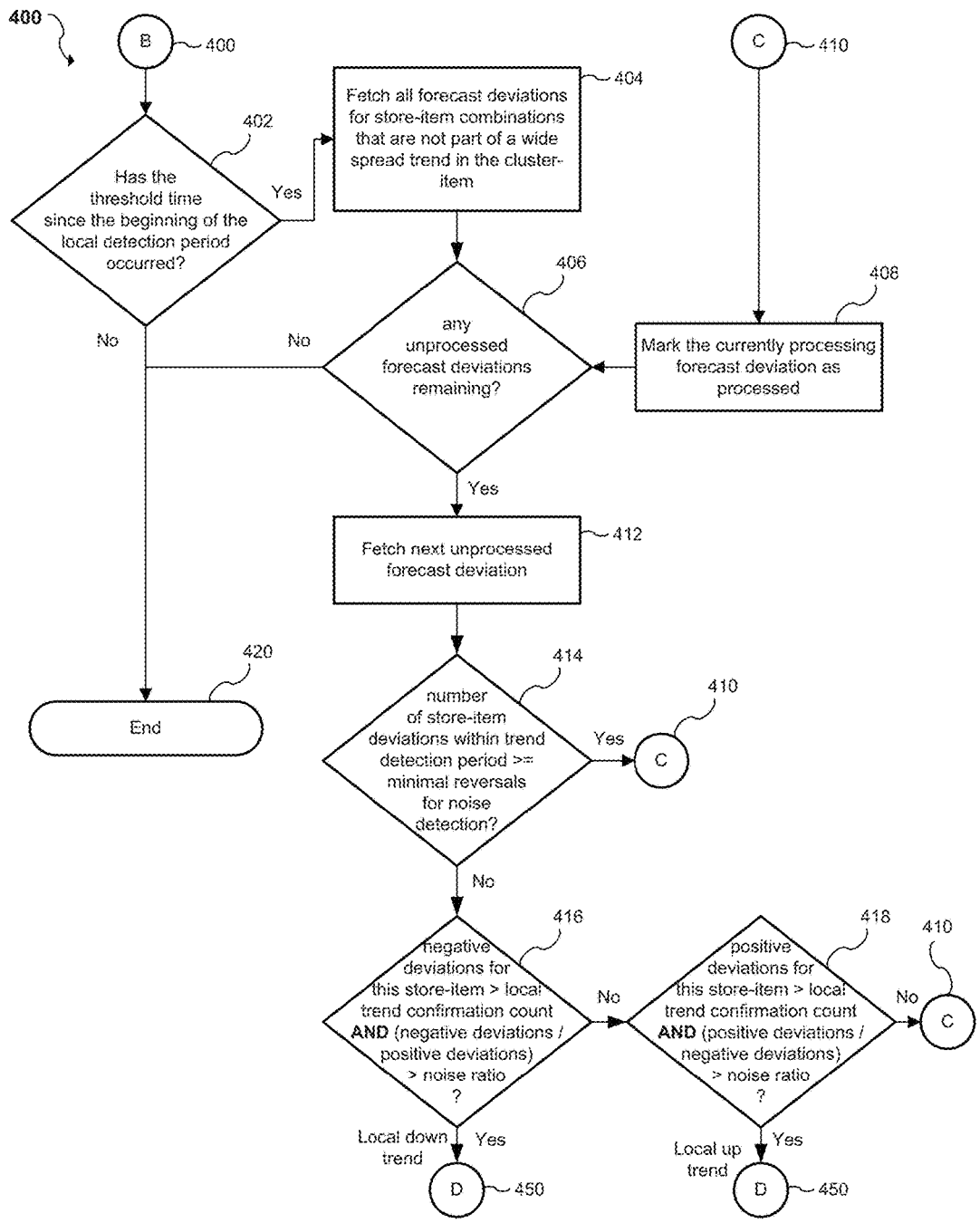

The forecast is adjusted for any wide-spread trend, as shown at block 300 and as further detailed in FIG. 1C. At block 302, the cumulative forecast and the cumulative sales for each item at each store participating in a wide-spread trend for the wide-spread trend detection period is determined and/or retrieved. The smoothing factor is computed, as shown at block 350. The smoothing index is equal to the cumulative sales for the wide-spread trend detection period of stores participating in trend divided by the cumulative forecast for the wide-spread trend detection period for stores participating in the trend. Another variation uses exponential convergence to the trend. In this case, the smoothing index is equal to one plus a numerator minus 1 divided by an exponential convergence factor, where the numerator is equal to the cumulative sales for the wide-spread trend detection period for the stores participating in the trend divided by the cumulative forecast for the wide-spread trend detection period for stores participating in the trend. Alternatively, the smoothing index computation factors the severity of the alerts and groups stores by alert severity.

Figure 1F:
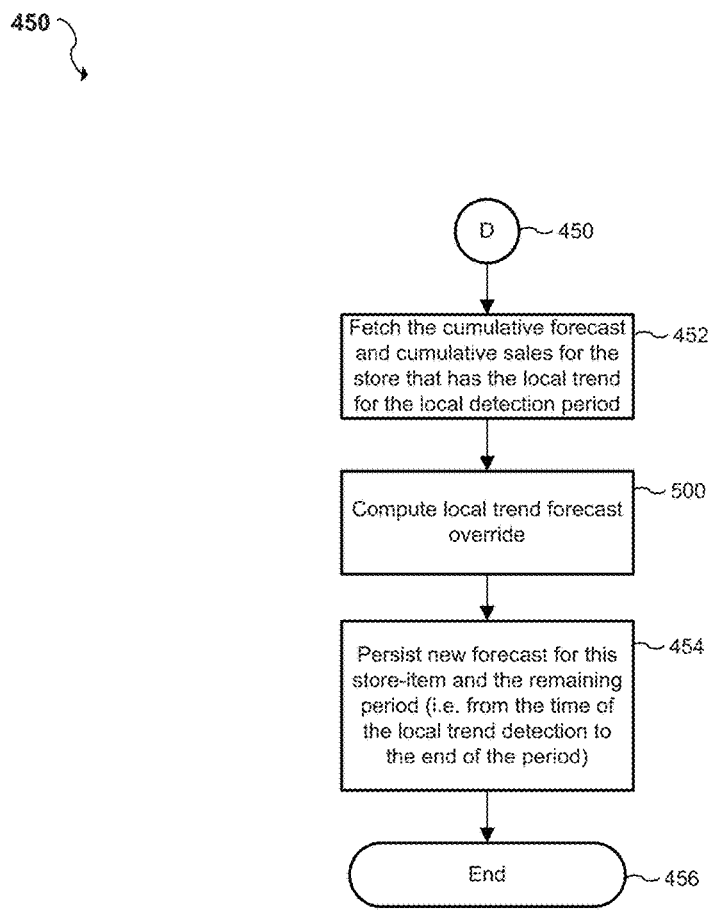
Figure 2A:
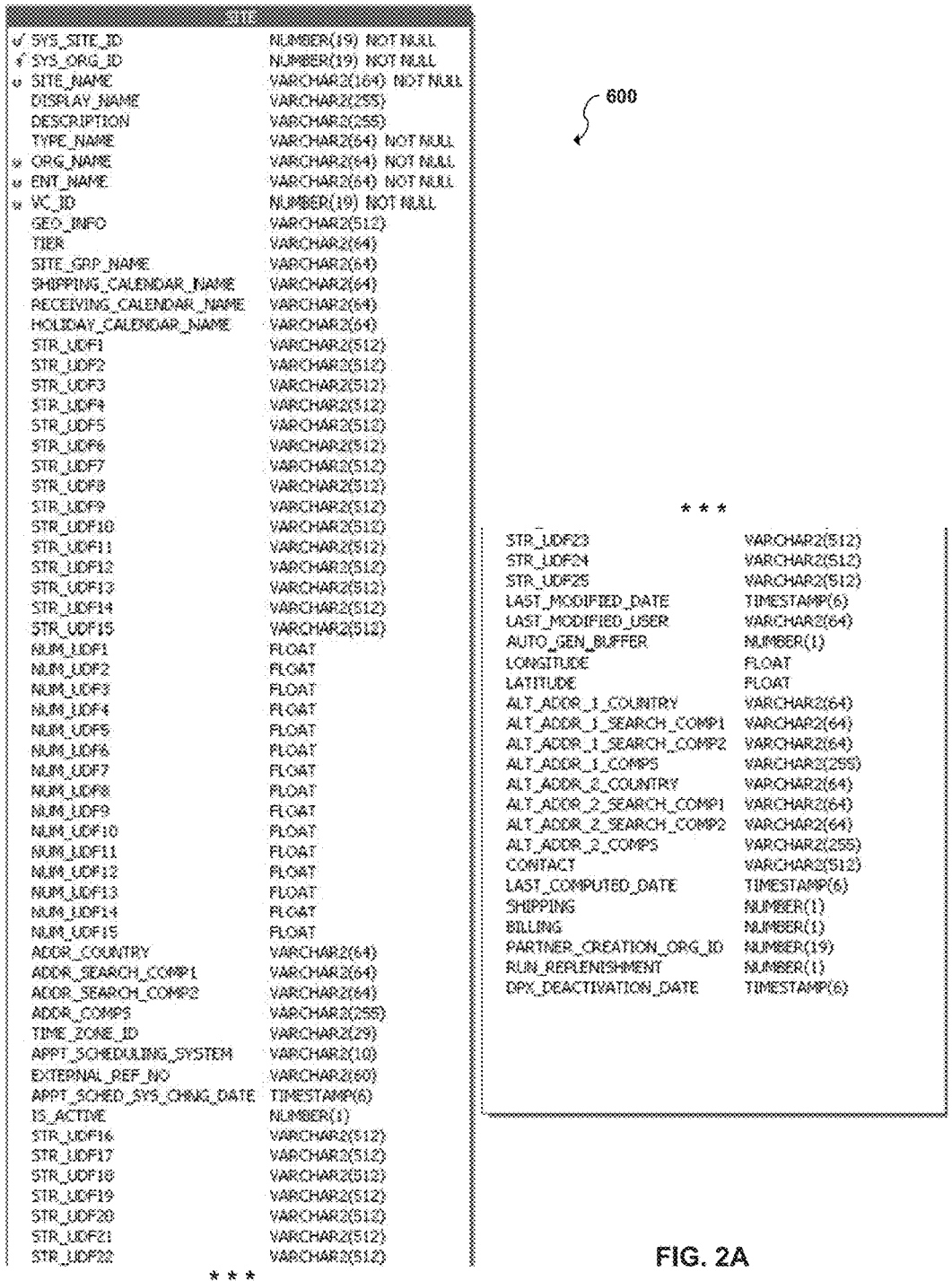
Figure 2C:
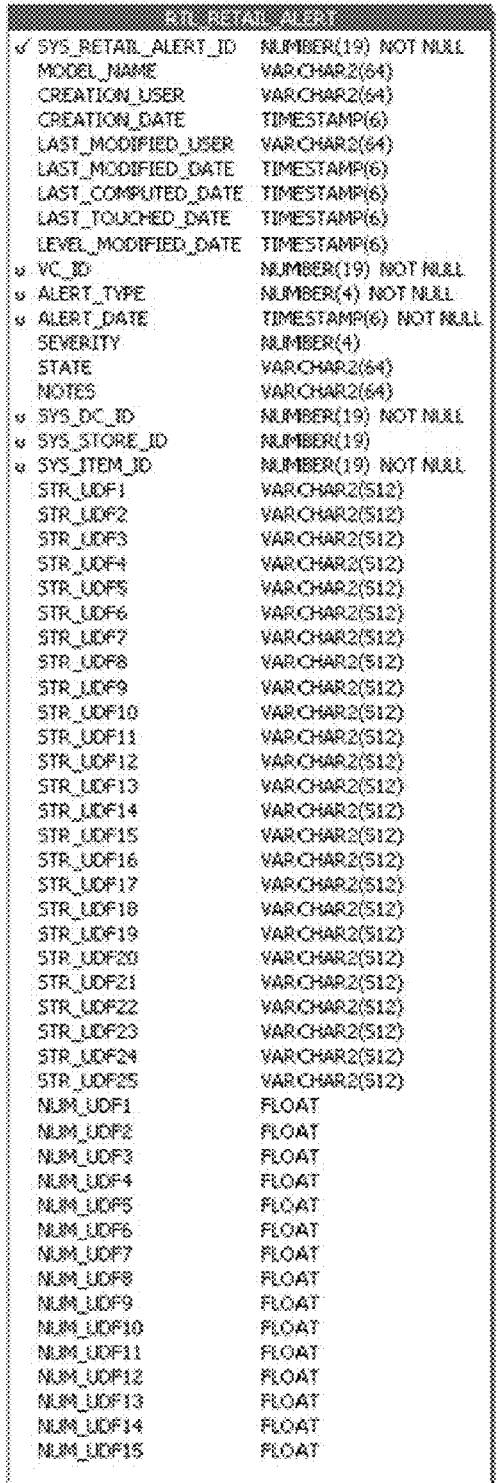
Figure 2E:
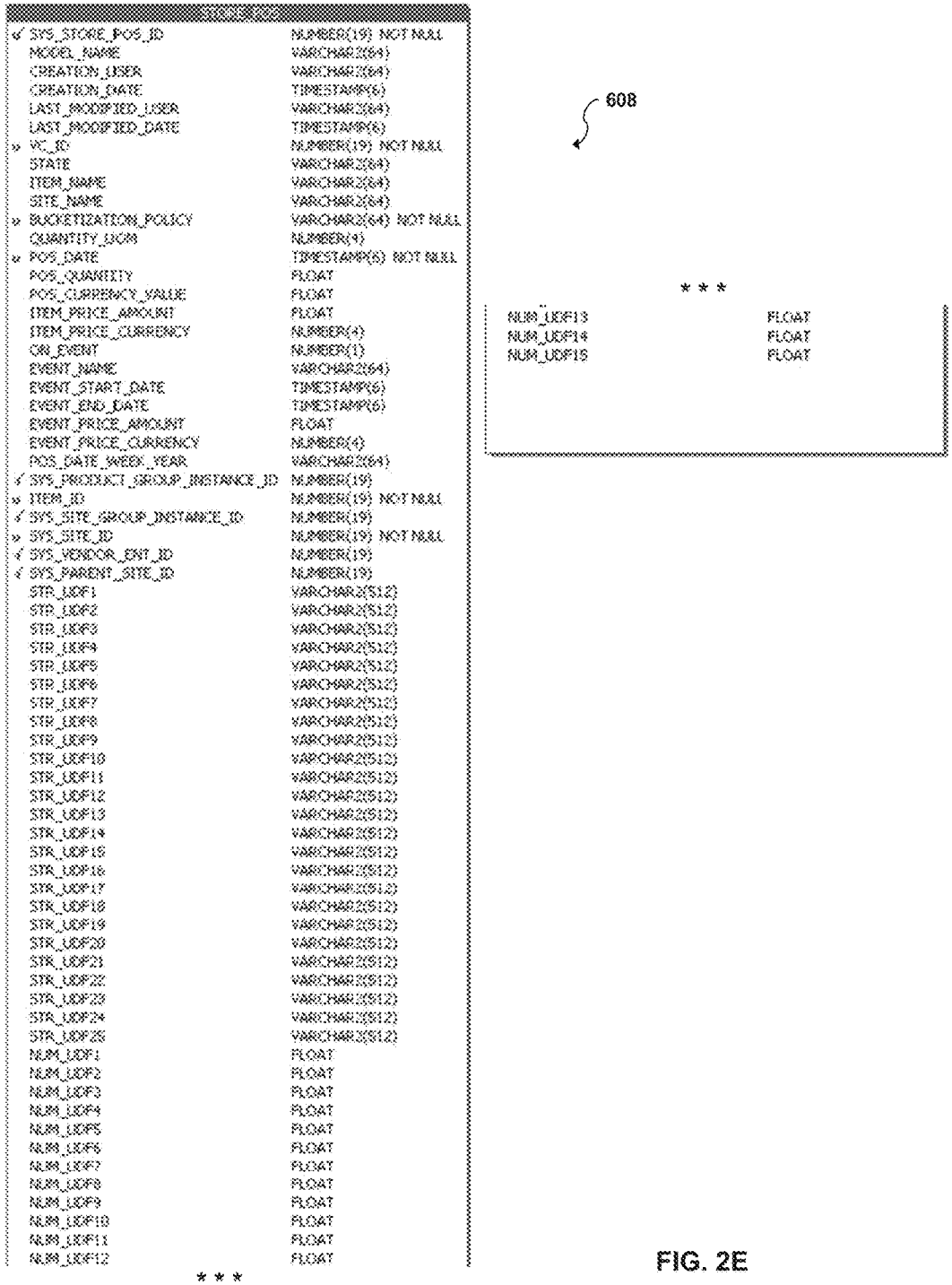

Local trends are detected, as shown at block 400 and as further detailed in FIG. 1F. At block 402, a determination is made as to whether a configurable threshold duration since the beginning of the period has occurred. If the threshold has not been met, then there is not enough information to perform reliable local trend detection at this time and processing continues at block 420. Otherwise, processing continues at block 404.

At block 404, the number of positive deviations and the number of negative deviations for store-item combinations that are not a part of a wide-spread trend in the cluster-item are determined and/or retrieved.

At block 406, a determination is made as to whether all of the unprocessed forecast deviations have been processed. If all of the unprocessed forecast deviations have been processed, then processing continues at block 412. Otherwise, processing continues at block 420. At block 412, the next unprocessed forecast deviation is retrieved.

At block 414, a determination is made as to whether the number trend reversals since the beginning of the local trend detection period is greater than or equal to a configurable minimum number of trend reversals for noise detection.

nbr_trend_reversals>=minTrendReversalsForNoise Detection

If the number trend reversals since the beginning of the local trend detection period is greater than or equal to a configurable minimum number of trend reversals for noise detection, then processing continues at block 410. Otherwise, processing continues at block 416.

At block 416, a determination is made as to whether (a) the number of negative deviations for an item within one of the stores since the beginning of the local trend detection period is greater than a configurable local trend confirmation count, and (b) the number of negative deviations for the item within the store since the beginning of the local trend detection period divided by the number of positive deviations for the item within the store since the beginning of the local trend detection period is greater than a configurable noise ratio.

$$\text{nbr\_negative\_deviations} > LocalTrendConfirmationRatio$$

AND $$\left(\frac{\text{nbr\_negative\_deviations}}{\text{nbr\_positive\_deviations}}\right) > LocalSignalNoiseRatio$$

If the above equation is true, then processing continues at block 450. Otherwise, processing continues at block 418.

At block 418, a determination is made as to whether (a) the number of positive deviations for an item within one of the stores since the beginning of the local trend detection period is greater than a configurable local trend confirmation count, and (b) the number of positive deviations for the item within the store since the beginning of the local trend detection period divided by the number of negative deviations for the item within the store since the beginning of the local trend detection period is greater than a configurable noise ratio.

$$\text{nbr\_negative\_deviations} > LocalTrendConfirmationRatio$$

AND $$\left(\frac{\text{nbr\_negative\_deviations}}{\text{nbr\_positive\_deviations}}\right) > LocalSignalNoiseRatio$$

If the above equation is true, then processing continues at block 450. Otherwise, processing continues at block 410.

At block 410, processing continues to block 408 which marks the forecast deviation as processed.

The forecast is adjusted for any local trends, as shown at block 450 and as further detailed in FIG. 1F. At block 452, the cumulative forecast and cumulative sales for the store that the local trend for the local trend detection period are retrieved and/or determined. The local trend forecast override is computed as shown at block 500. At block 454, the forecast for the for the item within the store and the remaining portion of the period is stored in the database.

Alerts are regenerated and the processing state is set for the particular cluster-item combination, as shown at blocks 206 and 208. Processing repeats for the next item within the store until all of the items at that store have been processed (then continues until all items at all stores individually have been processed), as shown at blocks 204 and 210.

Figure 4A:
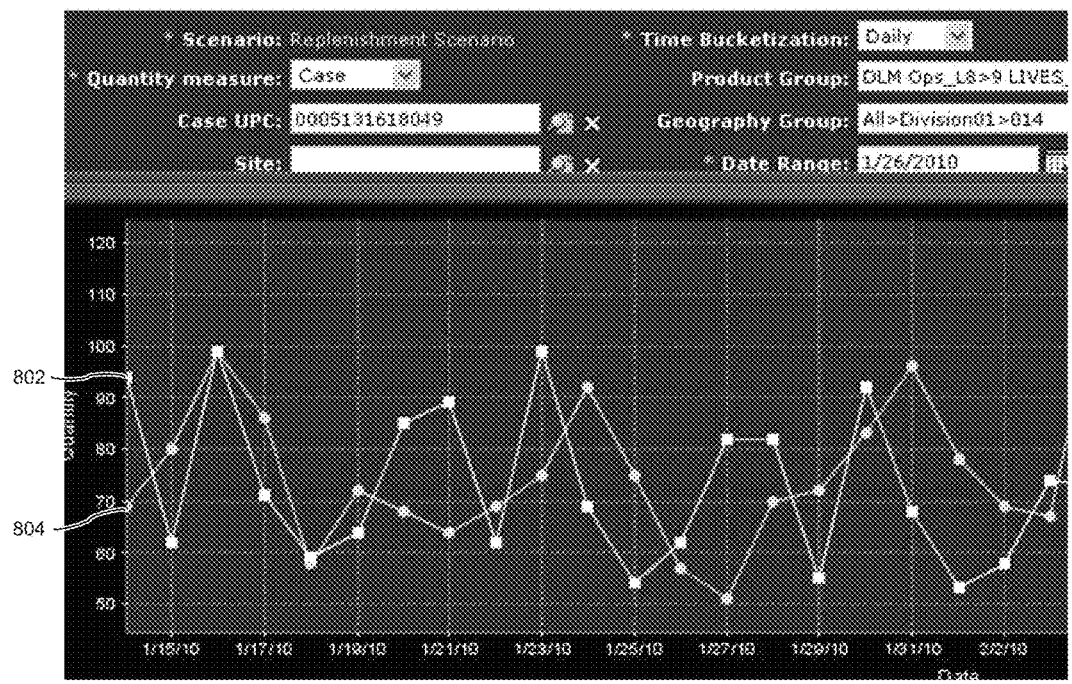
FIGS. 4A-4E illustrate exemplary user interfaces for continuous forecasting in accordance with an embodiment of the present invention.
Figure 4B:
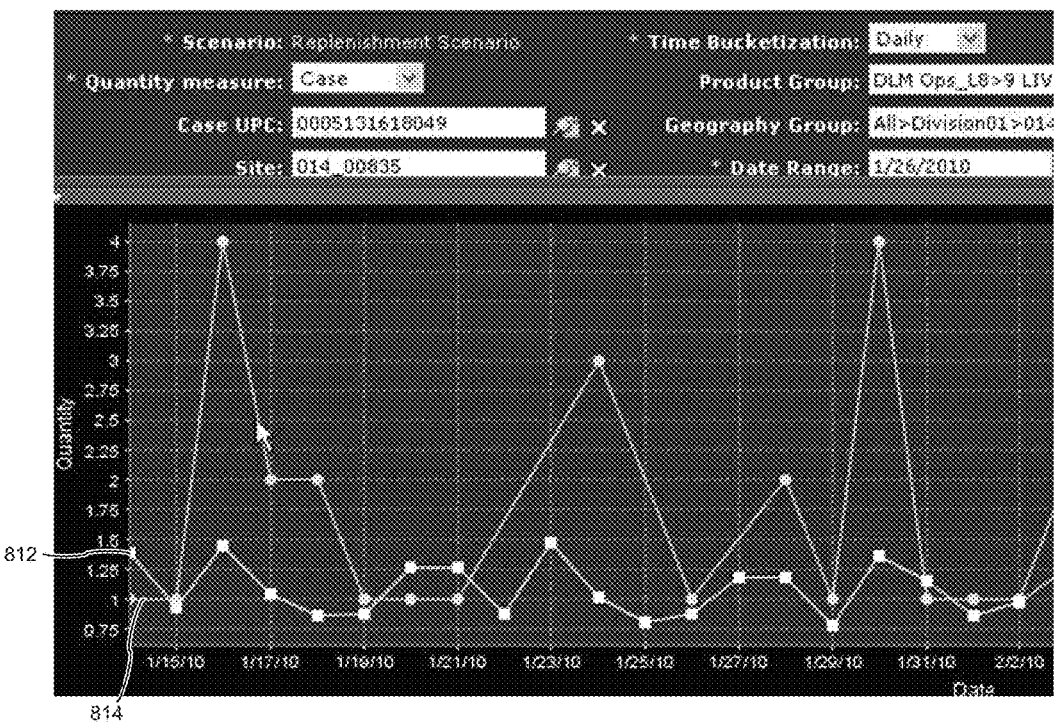
Figure 4C:
Figure 4D:
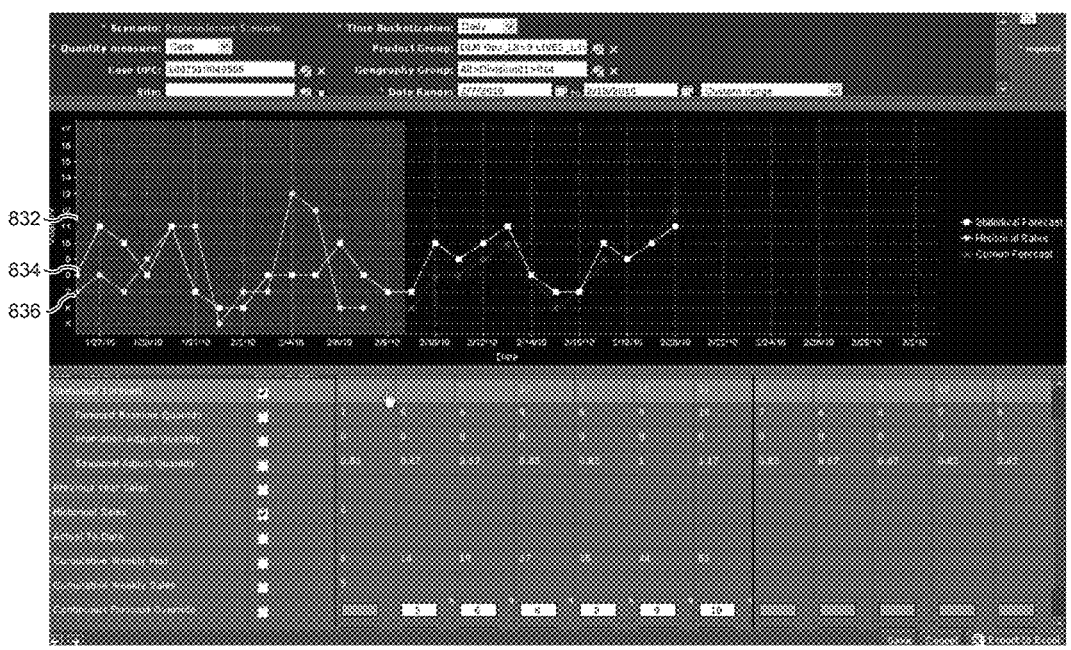
Figure 4E:

As shown in FIGS. 4A-4E, exemplary user interfaces for continuous forecasting in accordance with an embodiment of the present invention are shown. In particular, FIG. 4A is an exemplary user interface graphically indicating at a DC level that no trend is detected. As shown in this figure, line 802 represents the forecast without continuous forecasting and line 804 represents actual sales. FIG. 4B is an exemplary user interface graphically indicating a local down trend detection. As shown in this figure, line 812 represents the forecast without continuous forecasting and line 814 represents actual sales. FIG. 4C is an exemplary user interface graphically indicating a local up trend detection. As shown in this figure, line 822 represents the forecast without continuous forecasting, line 824 represents actual sales, and line 826 represents an adjusted forecast based on continuous forecasting. FIG. 4D is an exemplary user interface graphically indicating a wide-spread down trend detection. As shown in this figure, line 832 represents the forecast without continuous forecasting, line 834 represents actual sales, and line 836 represents an adjusted forecast based on continuous forecasting.

The present invention includes a computer program which may be hosted on a storage medium or other computer readable medium and includes instructions which perform the processes set forth herein. The storage medium or other computer readable medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A system for implementing a shared database in the management of real-time trends in a computer network in communication with a plurality of remote devices in a value chain, the system comprising:
   a plurality of remote computers in communication with a respective plurality of external collaborating entities, wherein each of the plurality of external collaborating entities is contained within one or more of a plurality of shared clusters, and wherein the plurality of external collaborating entities comprise two or more unaffiliated companies;
   a central server having a computer program stored in non-transient memory and one or more microprocessors;
   a network interface in communication with the central server and the plurality of remote computers over a network, the network interface being configured to provide continuous sales forecasting and adjusting a sales forecast for an enterprise;
   a shared database containing data in communication with the central server, wherein data contained within the shared database is transmitted and stored as a single version of the truth;
   wherein the central server is programmed by means of the computer program to:
   receive, via the network interface, a sales forecast for an enterprise over a configurable period of time into the shared database, wherein the sales forecast includes anticipated sales for a plurality of items within at least one of the plurality of shared clusters;
   periodically receive, via the network interface, actual sales information, sales anomalies and anticipated events within the at least one of the plurality of shared clusters over a computer network into the shared database, wherein the database is remotely accessible by at least two of the plurality of external collaborating entities using at least two of the plurality the plurality of remote computers and wherein at least a portion of the database is shared between at least two of the plurality of external collaborating entities without duplication;
   calculate positive and negative deviations from the anticipated sales of the sales forecast using the one or more microprocessors based on the sales information;
   determine whether one or more trends are occurring or have occurred using the one or more microprocessors based on the sales information, the positive and negative deviations, and the sales anomalies, wherein determining whether one or more trends are occurring or have occurred uses a pre-defined mathematical expression executed on the one or more microprocessors, and wherein determining whether one or more trends are occurring or have occurred comprises:
      determining whether one or more wide-spread trends are occurring or have occurred during a wide-spread detection period using the one or more microprocessors based on a comparison of the sales information, the positive and negative deviations, and the sales anomalies, wherein determining whether one or more wide-spread trends are occurring or have occurred uses a first predefined mathematical expression; and
      determining whether one or more local trends are occurring or have occurred during a wide-spread detection period using the one or more microprocessors based on a comparison of the sales information, the positive and negative deviations, and the sales anomalies, wherein determining whether one or more local trends are occurring or have occurred uses a second predefined mathematical expression;
   continuously adjust the anticipated sales of the sales forecast based on the sales anomalies, the trends and the anticipated events upon receipt thereof, wherein adjusting the anticipated sales of the sales forecast uses a pre-defined mathematical expression executed on the one or more microprocessors, wherein the continuous adjustment of the anticipated sales of the sales forecast based on the sales anomalies, the trends and the anticipated events upon receipt thereof is limited to one or more of the plurality of shared clusters; and
   transmit, via the network interface, one or more web pages containing the adjusted sales forecast to respective displays of one or more of the plurality of remote computers in communication with the one or more of the plurality of external collaborating entities.

2. The system of claim 1, wherein the sales forecast includes a week of daily forecasts.

3. The system of claim 2, wherein the pre-defined mathematical expression used to adjust the anticipated sales of the sales forecast comprises multiplying each daily forecast for the remainder of the week by a mathematical smoothing factor.

4. The system of claim 1, wherein the determining whether one or more wide-spread trends are occurring or have occurred includes determinations at multiple hierarchical levels.

5. The system of claim 1, wherein the determining whether one or more wide-spread trends are occurring or have occurred includes determining whether a configurable wide-spread trend confirmation ratio and a configurable wide-spread noise ratio have been met.

6. The system of claim 1, wherein the determining whether one or more local trends are occurring or have occurred includes determinations at multiple hierarchical levels.

7. The system of claim 1, wherein the eighth computer code for determining whether one or more local trends are occurring or have occurred includes determining whether a configurable local trend confirmation count and a configurable local noise ratio have been met.

8. The system of claim 1, wherein the periodically receiving actual sales information, sales anomalies and anticipated events occurs at least substantially at the same time as the sales occur.

9. The system of claim 1, wherein the periodically receiving actual sales information, sales anomalies and anticipated events occurs hourly.

10. The system of claim 1, wherein the periodically receiving actual sales information, sales anomalies and anticipated events occurs daily.

11. The system of claim 1, wherein the periodically receiving actual sales information, sales anomalies and anticipated events occurs weekly.

12. The system of claim 1, wherein the determining whether one or more local trends are occurring or have occurred includes exponential convergence using a mathematical smoothing factor.

\* \* \* \* \*